United States Patent [19]
Nikolai et al.

[11] Patent Number: 5,775,187
[45] Date of Patent: Jul. 7, 1998

[54] METHOD AND APPARATUS OF PRODUCING A SURFACE WITH ALTERNATING RIDGES AND DEPRESSIONS

[76] Inventors: Zoubkov Nikolai, 117463 Novoyasenevsky prosp. 32-161, korp. 1; Ovtchinnikov Alexander, 105523, 15-th Parkovaia, st, 46-3 korp 5, both of Moscow, Russian Federation

[21] Appl. No.: 545,640

[22] PCT Filed: Apr. 27, 1994

[86] PCT No.: PCT/RU94/00121

§ 371 Date: Feb. 5, 1996

§ 102(e) Date: Feb. 5, 1996

[87] PCT Pub. No.: WO94/25217

PCT Pub. Date: Nov. 10, 1994

[30] Foreign Application Priority Data

Apr. 30, 1993 [RU] Russian Federation ............ 93017599

[51] Int. Cl.[6] ................... B23B 17/00; B26D 1/01
[52] U.S. Cl. ................... 82/1.11; 407/113; 407/114
[58] Field of Search .................. 407/113, 114, 407/115; 29/825; 82/1.11

[56] References Cited

U.S. PATENT DOCUMENTS

| | | | |
|---|---|---|---|
| 4,854,785 | 8/1989 | Lowe et al. | 407/114 X |
| 4,936,719 | 6/1990 | Peters | 407/113 X |
| 5,059,069 | 10/1991 | Lagerberg | 407/114 X |
| 5,325,748 | 7/1994 | Ehrenberg . | |
| 5,349,888 | 9/1994 | Schmid | 407/113 X |

FOREIGN PATENT DOCUMENTS

| | | | |
|---|---|---|---|
| 910365 | 3/1982 | U.S.S.R. | 82/1.11 |
| 1 301 567 | 4/1987 | U.S.S.R. | 407/115 |
| 1558556 | 4/1990 | U.S.S.R. . | |

*Primary Examiner*—Carl J. Arbes

[57] ABSTRACT

A method of machining and a tool is used for obtaining patterns in the form of alternating ridges, pads, cells, and ridges of a triangular cross section on the surface of a blank. The method facilitates selection of the geometrical parameters of the tool and the machining mode for the tool to obtain alternating ridges and depressions with parallel sides of the profile at predetermined intervals and predetermined heights and angles of slope. The width of the space between projections can be varied in the range of millimeters and micrometers.

20 Claims, 18 Drawing Sheets

METHOD AND APPARATUS OF PRODUCING A SURFACE WITH ALTERNATING RIDGES AND DEPRESSIONS

BACKGROUND OF THE INVENTION

1. Field of the Invention

The present invention relates to machining of materials and, more specifically, to a method of producing surfaces with alternating ridges and depressions and a tool for effecting same.

2. Discussion of Relevant Art

A current problem today is to provide surfaces with a deep regular relief in the form of alternating ridges and depressions. Such surfaces, e.g., those having ribs on tubes, are widely used to intensify heat transfer processes in convective and condensation-evaporation heat exchange. Among the devices using such surfaces are heat exchangers and radiators, condensers and evaporators in refrigeration and cryogenic machines, heat tubes, steam generators and other devices.

A most common highly-efficient method for making ribbings is a roll-forming or knurling method residing in plastic deformation of a blank surface by means of a knurl tool.

However, this method calls for the use of special equipment and costly tools, and each tool is designed to produce the ribbing of specific pitch and height, because the profile of a depression between the ribs fully copies the profile of the last knurl.

For refrigeration and cryogenic engineering, as well as for heat transfer tubes it is necessary to provide the ribs with depressions therebetween measuring tenths of a millimeter in width. The existing methods fail to produce such ribbing and technologically limit the provision of optimal parameters of heat exchange.

The heat transfer surfaces made in the form of tenons (e.g., projections) are more efficient than those shaped as ribs. Given evaporization heat exchange, it is expedient that cell-type surfaces be used which have deep depressions formed by curvilinear ridges. The provision of such reliefs presents a technological problem and is a fairly labour-consuming process.

Edge filters are of considerable current use. They represent a combination of ribs on one side of the filtering surface, the depressions between ribs communicating with the other side of the filtering surface. Today these filters are made in the form of a precast construction which makes medium and fine cleaning filters difficult to manufacture. On the whole, the provision of edge filters with a cleaning fineness of up to several micrometers presents a current technical problem.

Hardening and protective coatings of great thickness with preset properties are extensively used at friction points and joints and as means against corrosion. A higher efficiency of the processes of producing coatings and broader possibilities for managing their properties are a promising trend, enabling one to save critical alloyed steels and alloys.

The provision of a threaded profile on thin-walled tube blanks using current methods of providing threads with chip disposal results in a substantial loss of strength of the tube wall. This is because the tube wall is thinned down under the thread, and the current thread rolling methods require the use of special knurl or rolling equipment and costly tools. Each tool is designed to form only one type of thread of a specific pitch and profile depth.

Thus, there is a problem of developing a method allowing the use of standard metal cutting equipment and ordinary tools, enabling one to obtain threads of different profile, diameter, pitch and depth, given minimal wastes of the material being machined. There is also a problem of enhancing the efficiency of threading and improving the quality of thread while obtaining a thread profile using an ordinary cutter on high formable materials, e.g., copper and aluminium.

A method known in the art for producing screw ribs on tubes used in heat transfer devices is described in the article entitled "High Performance Heat Transfer Tube" by Y. Tanno, K. Ooizumi, in *Tube International*, page 51, March, 1987. The method described consists of undercutting the surface layers of the material with the aid of a cutter shaped tool, which leads to the deformation of the surface layers. The ribs are machined without producing cuttings. These machined surface layers increase the efficiency of heat transfer during condensation and evaporation.

However, in order to accomplish the known method it is necessary to indicate geometric characteristics of the tool and the modes of machining.

Also known in the art is a method of producing surfaces with alternating ridges and depressions (Soviet Union author's certificate SU 1558556), residing in that with a relative movement of the tool and the billet the surface layer of the latter is undercut or trimmed by the tool having one rectilinear cutting edge and the undercut or trimmed layer is deformed plastically and retained on the blank surface. The method allows obtaining ribbed surfaces with corrugated ribs.

However, using the aforesaid methods, it is impossible to provide surfaces with desired geometric and thermal parameters and to choose the geometric characteristics of the machining tool. Additionally, prior art methods are confined to providing surfaces with alternating depressions and ridges within only a narrow range of types and dimensions.

SUMMARY OF THE INVENTION

The object of the invention is to provide a method for producing a surface with alternating depressions and ridges and a tool for performing that method. The method and the tool have machining modes and geometric parameters that provide desired geometric characteristics of the machined surfaces and a broad range of surfaces of different types and geometric characteristics.

The object of the invention is satisfied by the method of producing surfaces with alternating ridges and depressions, whereby as the tool and the blank move, the surface coating of the blank is undercut by the tool having one rectilinear cutting edge and the undercut layer is plastically deformed, being retained on the blank surface, according to the invention, providing a profile ridges and depressions with parallel sides. The main angle in the tool plan view is taken from the relationship:

$$\omega = \arcsin [a/(S \cdot \xi)],$$

where $a$ is the preset thickness of ridge, $S$ is the preset pitch of profile ridges, $\xi$ is the distortion coefficient of the ridge profile, equalling 0.9 to 1.1, and auxiliary angle $\phi_1$ in the tool plan is chosen as $(90°-\psi)$, where $\psi$ is the given angle of deviation of the ridge from vertical position (perpendicular to the base), and the depth $t$ of introducing the tool is taken as $t = |h-\xi-S_o \cdot \cos(\phi-\psi/2) \cdot (\sin\phi/\cos\psi)|$, where h is the given height of the profile ridges,
the value of the tool feed rate $S_o$ is chosen equal to the preset profile pitch.

This selection of the machining modes and geometric parameters of the tool enables one to obtain a profile with the parallel sides of ridges of the given geometric characteristics, such as pitch S of the profile ridges, height h of the profile, thickness a of the ridge, the angle of the profile deviation from the vertical position (perpendicular to the base). In the given case the profile is formed without wastes of the material.

The object of the invention is also achieved by a method of producing surfaces with alternating ridges and depressions, whereby as the tool and the blank move relative to each other, the surface layer of the blank is undercut by the tool cutting edge. The undercut surface layer is plastically deformed and retained on the surface of the blank. Projections and depressions of a triangular profile are thus obtained. The depth t of tool penetration is at least equal to:

$$t = S/|ctg\,\omega + ctg\,\omega_1 + \sqrt{2ctg\,\omega \cdot ctg\,(\omega/2 + \omega_1/2)}\,|,$$

where S is the given pitch of the profile ridges, $\omega$ and $\omega_1$ are the slopes of the triangular profile,
the tool feed rate $S_o$ being equal to pitch S of the profile, and the direction of feed being chosen toward the side opposite to the cutting edge, main and auxiliary angles $\phi$ and $\phi_1$, respectively, in the tool plan being taken equal to angles $\omega_1$, $\omega$, respectively, of the slopes of the sides of the triangular profile.

The aforesaid selection of depth t of the tool introduction, values $S_o$ of the tool feed, directions of the feed, angles $\phi$ and $\phi_1$ of the tool in plan allows obtaining a triangular profile of depressions.

In order to make depressions with parallel walls actually with a zero width it is necessary that the main angle $\phi$ in the tool plan view should be chosen greater or equal to auxiliary angle $\phi_1$ in the tool plan view. The depression, actually with a zero width, is the interface of the blank material surface.

In this case, the material of the ridges is plastically deformed, thus making it possible to obtain a harder and stronger layer on the blank surface.

It is expedient that the previously machined surface be worked again with a new main direction of the tool that is at an angle to the main direction of the tool in the initial machining operation. Machining the ridges and cavities obtained in the initial machining operation in a new direction enables the surface of the blank to be formed into pins.

To make pins of different configurations and dimensions, it is expedient that during this further machining, at least one of the parameters, namely at least one of the feed rate $S_0$, the depth of the tool penetration t, the main angle $\gamma$ of the tool in plan view, or the auxiliary angle $\gamma_1$ of the tool in plan view should be selected to have different values than the values of these parameters used in the initial machining operation.

During the initial machining operation or subsequent machining, it is possible to change the value of the tool feed rate $S_0$ and or the depth of tool penetration t. Altering the machining modes as above described makes it possible to obtain ridges and depressions with different pitches and heights on the surface of the blank.

During the machining of sheet blanks, it is expedient the latter be worked from both sides given mismatch directions of the main tool movement, the sum total of the depths of tool introduction during the machining of both sides exceeding the initial thickness of a sheet blank.

Such two-sided machining makes it possible to connect the depressions of the profiles of both sides of the sheet blank. Given a small width of the depressions obtained, the machined sheet blank, at least on one side, represents essentially an analogue of a filter mesh.

A surface layer that includes material of a different composition than the material of the blank may be provided at the surface of the blank when machining the alternating ridges and depressions on the surface of the blank. It is also possible to provide a composition layer of a different material after such machining. The alternating depressions formed by such machining can be filled with material of a composition having properties that are different from the properties of the material of the blank.

Besides, in the process of making surfaces with alternating ridges and depressions, or after machining, it is also possible to alter the properties of ridge material.

Such machining ensures the provision of a composition layer on the surface of a blank, consisting of the layers of the blank material in the form of a matrix and a filler-material chosen in keeping with a given technical problem. Thus, it is possible to control physical, chemical and mechanical properties of the surface layer of a machined blank.

During machining it is desirable that the configuration of the surface of cutting and/or of the surface being machined and/or already machined, be changed to alter the configuration of ridges obtained.

It is possible that the depth of depressions on the cutting surface be chosen at least equal to the thickness of the ridges made during the initial machining operation, providing through openings on the ridges obtained in the basic treatment.

It is also expedient that in the process or following the machining, the tops of the ridges be deformed plastically to form platforms on the tops of the ridges.

In some cases, it is expedient that the tops of the ridges be deformed until the sides of the platforms formed tightly contact each other.

In order to make a cellular relief on the blank surface in the process of producing surfaces with alternating ridges and cavities, it is necessary the ridges formed be periodically torn lengthwise, one of the ridge ends be separated from the blank, and the separated end of the ridge be bent towards the tool.

The surface of the ridges obtained is curvilinear. Taken together, the ridges form a cellular structure on the blank surface with cavities communicating with one another.

It is possible to form inner depressions on the blank before the outer surface is machined. The distance between the outer surface of the blank and the inner depressions is less than the depth of tool penetration t.

It is also desirable that after machining of a sheet or round blank, depressions shall be made from the side opposite to the machined one, which communicate with the depressions in the previously machined surface.

Thus, this machining provides a surface with filtering properties, and this filtering surface is a slit one.

In some cases, it is expedient that prior to and/or after machining of the blank, the latter should be subjected to resilient and/or plastic deformation.

In order to obtain different configurations of ridges and cavities, as well as to increase the process efficiency, the machining can be effected using one or several tools.

In order to obtain an actually threaded triangular symmetric profile of the blank surface with pitch S and angle $\beta$ between the sides of the ridges for an external threaded profile or between the sides of a depression for an internal threaded profile, depth of the tool introduction is taken at least equal to:

$$t=0.29S \cdot ctg(\beta/2),$$

and to obtain an external threaded profile outside diameter $D_o$ of the blank is taken from the relationship:

$$D_o = D - 0.71S \cdot ctg(\beta/2),$$

where D is the given outside diameter to the top of the profile,
and to obtain an internal threaded profile the inside diameter $D_2$ of the blank is taken from the relationship:

$$D_2 = D_1 - 0.59S \cdot ctg(\beta/2),$$

where $D_1$ is the given diameter of the threaded profile to its depressions.

The object of the invention is also achieved in that the tool for accomplishing the method of producing surfaces with alternating ridges and depressions is made in the form of a cutter having the front and main rear surface, the intersection of which makes a straight main edge, and an auxiliary rear surface, the intersection with which makes a straight auxiliary edge. In so doing, the main edge is a cutting edge. According to the invention, the front angle γ of the tool is in the range:

$$\gamma = 10° \text{ to } 65°,$$

and angle $\gamma_1$ between the main plane and the line of intersection of the front surface with the plane, perpendicular to the projection of the auxiliary edge of the tool on the main plane, is chosen in a range:

$$\gamma_1 = 30° \text{ to } 80°,$$

and the angle between the front and auxiliary rear surfaces of the tool is obtuse.

Using this tool it is possible to make surfaces with alternating ridges and depressions of different configurations and dimensions.

BRIEF DESCRIPTION OF THE DRAWINGS

The invention will now be described by way of exemplary embodiments thereof, reference being made to the accompanying drawings, wherein.

DETAILED DESCRIPTION OF PREFERRED EMBODIMENTS

A method of producing surfaces with alternating ridges and cavities having parallel and triangular sides of the profile is accomplished by tools having similar configurations for different surfaces. In order to obtain surfaces with alternating ridges and depressions of different types the changes in the tool relate only to the value of geometric parameters of its working part. Therefore, let us consider the elements and geometric characteristics of the tool.

Figure 1:
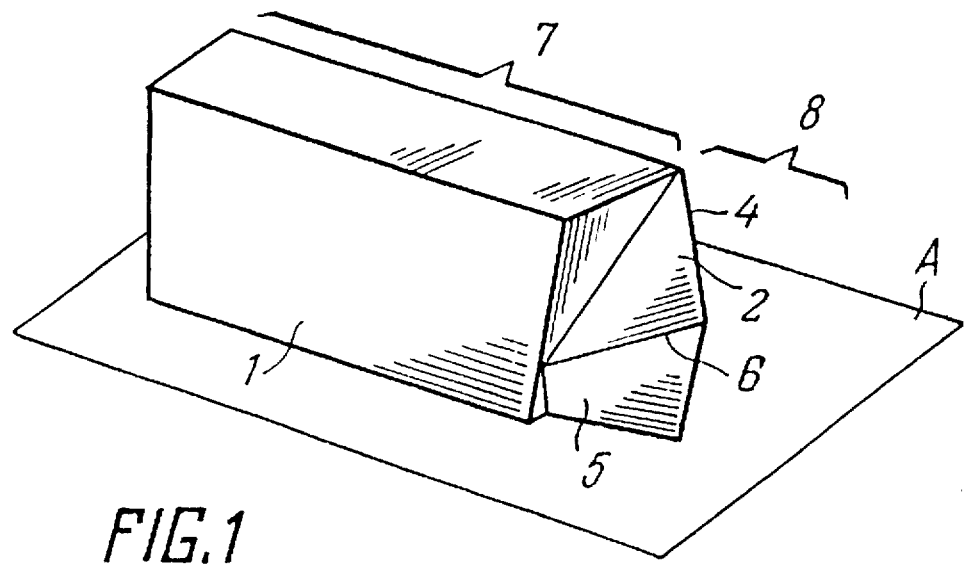
FIG. 1 shows the general view of the tool for accomplishing the method, according to the invention.
Figure 2:
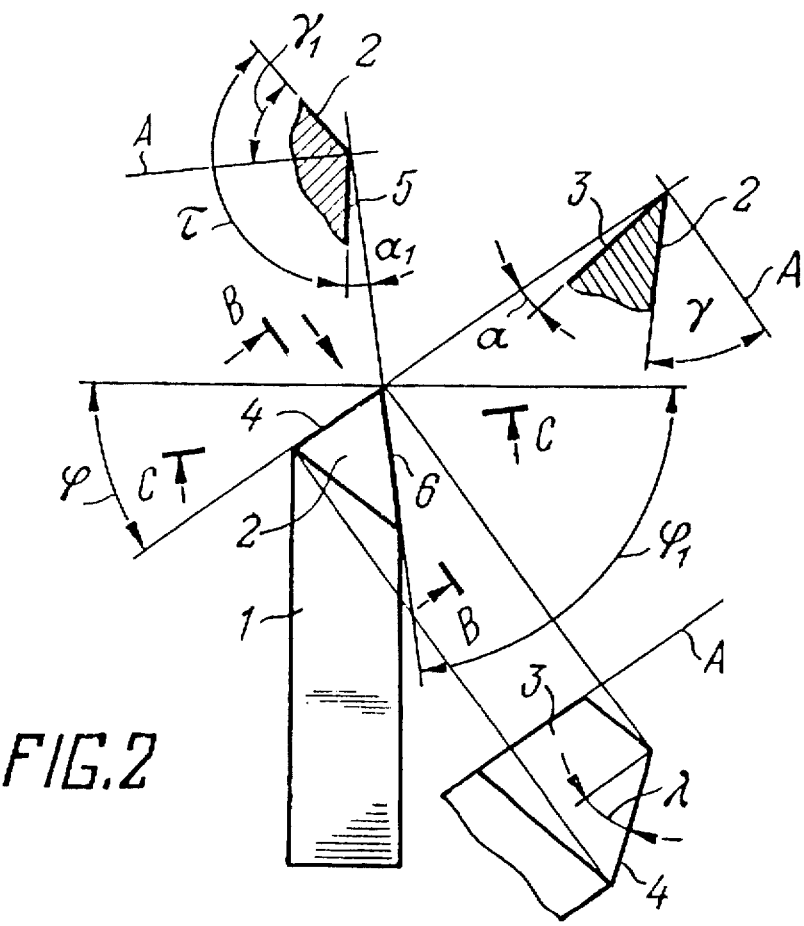
FIG. 2 shows the geometric parameters of the working part of the tool according to the invention.

Tool 1 (FIGS. 1, 2) to make the surfaces with alternating ridges and depressions is shaped as a cutter and has front and rear surfaces 2 and 3, respectively, the intersection of which forms a rectilinear main edge 4, as well as an auxiliary rear edge 6, the intersection of with the front surface 2 forms a rectilinear auxiliare edge 6, the main edge 4 being a cutting one. Structurally, the tool 1 consists of a holder 7 designed to fix it on a machine, and a working part 8 which effects machining.

According to the invention, the front angle γ of the tool 1 (FIG. 2) between the main surface A and the line of intersection of the front surface 2 with plane B—B, perpendicular to the ridge of the main edge 4 to the main plane A is taken in a range of:

$$\gamma=10° \text{ to } 65°,$$

an angle $\gamma_1$ between main plane A and the line of intersection of the front surface 2 with plane C—C, perpendicular to the ridge of the auxiliary edge 6 of the tool 1 to the main plane A is chosen in a range of:

$$\gamma_1=30° \text{ to } 80°,$$

in so doing, angle τ between the front 2 and auxiliary rear 5 of the surfaces of the tool 1 is obtuse.

The specific combination of angles is chosen subject to the properties of the material being machined and the given technical problem.

Exceeding an angle γ of more than 65° and $\gamma_1$ of more than 80° impermissibly reduces the strength of the working part 8 of the tool 1, which brings about its destruction in the zone of the main cutting edge 4.

Decreasing the angle γ to less than 10 degrees leads to impermissible plastic deformations of the material machined, thus not allowing the provision of ridges and depressions of the given form and geometric parameters.

Decreasing the angle $\gamma_1$ to less than 30 degrees results in the separation of the blank 10 material in the form of cuttings.

The working part 8 of the tool 1 is made, subject to a material machined, from tool steels or hard alloys. Flat surfaces of the working part 8 of the tool 1 ensures technological effectiveness of its manufacture.

Figure 3:
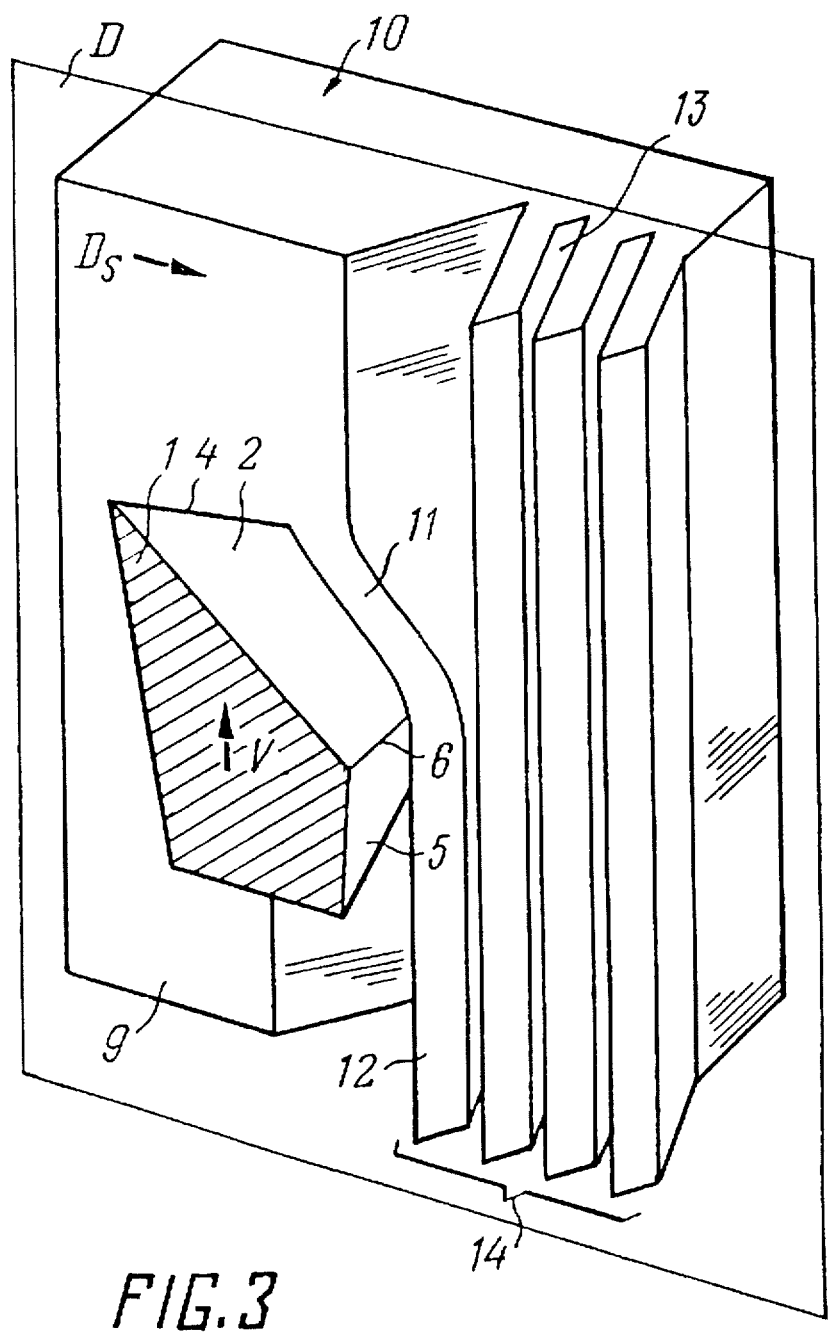
FIG. 3 is the method of making a surface with alternating projections and depressions with parallel sides of the profile on a flat blank.
Figure 4:
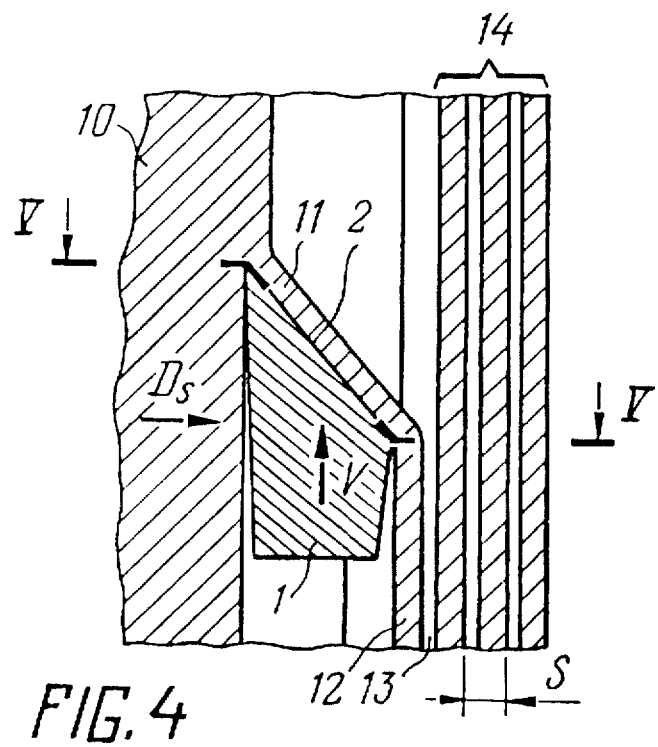
FIG. 4 is the cross-section by plane D as in FIG. 3.
Figure 5:
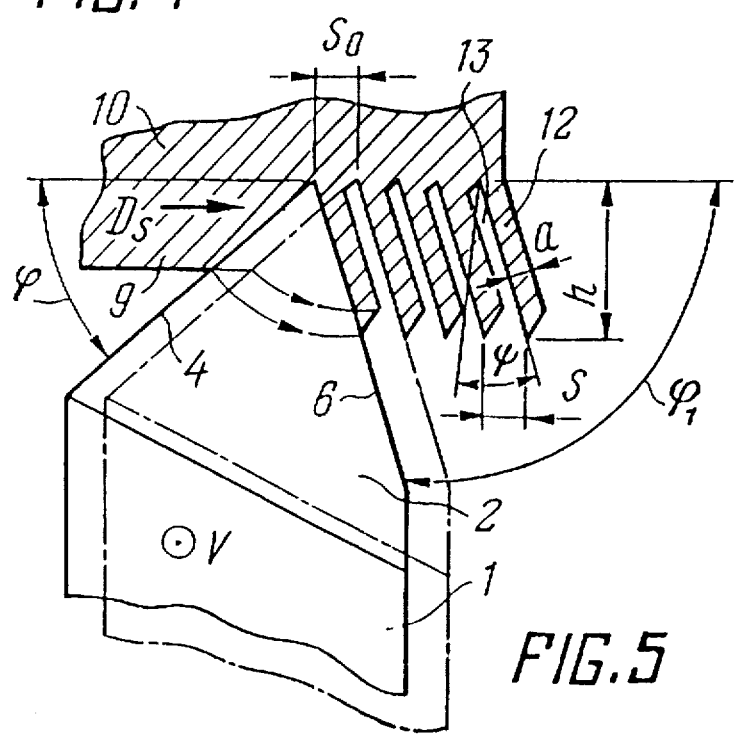
FIG. 5 is the cross-section along V—V as in FIG. 4.

The method of producing surfaces with alternating ridges and depressions with parallel sides of the profile, according to the invention, consists in cutting the surface 9 being machined (FIGS. 3, 4) by the cutting edge 4 of the tool 1. The undercut layer 11 is plastically deformed by the front surface 2 of the tool 1 and in the form of a ridge 12 with parallel sides is preserved on the blank 10. Main motion V, as well as continuous or discrete motion of feed D, are imparted to the tool 1 or blank 10. The obtained combination of ridges 12 and depressions 13 forms a ribbed surface 14 which is preassigned with pitch S (FIG. 5), height h of ridges 12 of the profile, thickness a of ridges 12 and angle ψ of the deviation of ridges 12 from a vertical (perpendicular to the machined surface 9 of the blank 10) position. To obtain the ribbed surface 14 with the preset parameters of the ridges 12 and depressions 13 the main angle in the plan of the tool 1 (FIGS. 2, 5) is taken from the relationship:

$$\phi=\arcsin [a/(S\cdot\xi)],$$

where ξ is the coefficient of distortion of the profile of the ridge 12 (rib), equal to 0.9–1.1.

Coefficient of distortion ξ of the profile of the ridge 12 is chosen experimentally within said ranges and depends on the properties of the material being machined.

Depth t of the tool 1 introduction, with due regard for the chosen main angle φ in the plan of the tool 1 is taken from the relationship:

$$t=[h\cdot\xi-S\cdot\cos(\phi-\psi)/2]\cdot(\sin\phi/\cos\psi).$$

The auxiliary angle $\phi_1$ in the plan of the tool 1 is taken equal to (90–ψ) ensuring the given angle ψ of the deviation of the ridges 12 from the vertical position. The assigned pitch S of the ridges 12 is ensured by choosing the value of feed $S_o=S$.

Figure 6:
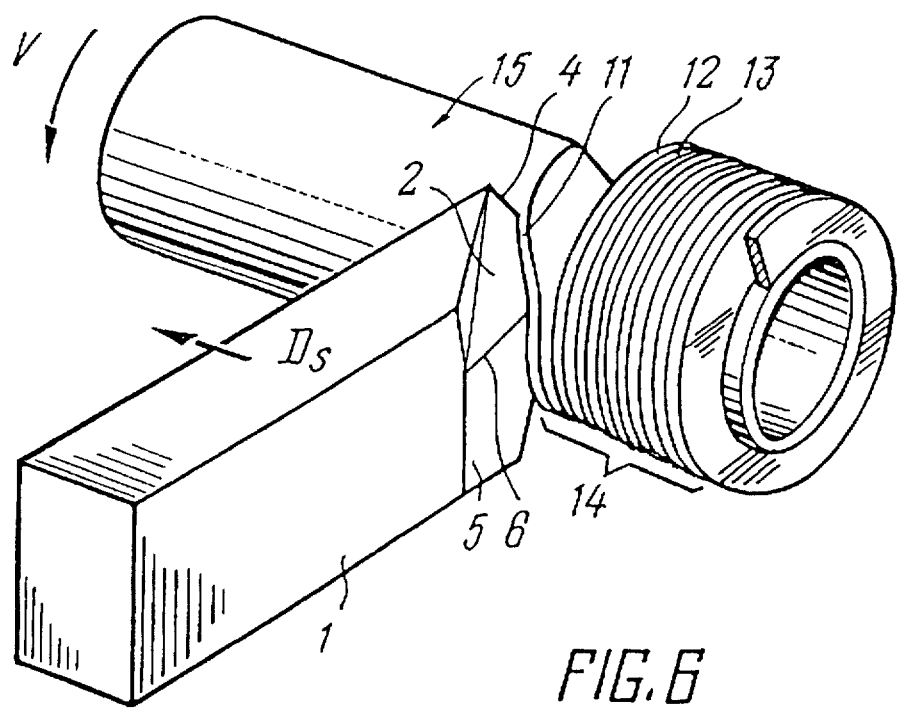
FIG. 6 illustrates a process of making a surface with alternating ridges and depressions having parallel sides of the profile on a cylindrical blank.

Thus, the chosen geometric parameters of the tool 1 and the machining modes allow the ribbed surface 14 to be obtained on flat blanks 10 (FIG. 3) and on cylindrical blanks 15 (FIG. 6) with a thermal parameter of such ribbed surface 14.

Let us consider the specific exemplary embodiment of the method.

Figure 7:
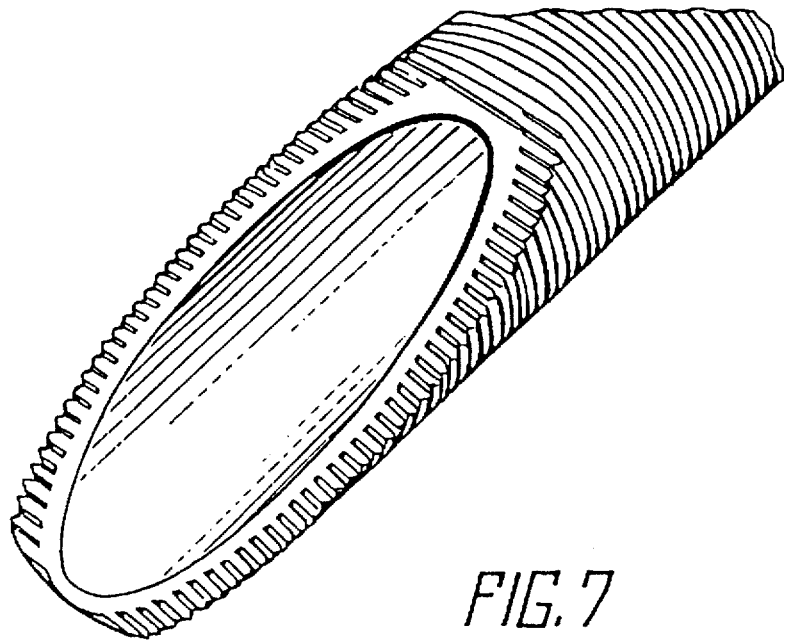
FIG. 7 shows an external view of the ribbed surface obtained on the tube blank.

It was necessary to produce the ribbed surface 14 having alternating ridges 12 and depressions 13 with parallel sides of the ridges 12 with pitch S equal to 1.0 mm, ridge thickness a of 0.5 mm height h of projection of 2.2 mm and the ridge angle from vertical position of 10°. It was previously established experimentally that for copper the deviation coefficient ξ of the profile of the ridge 12 (rib) is equal to 1.04. According to the invention there were chosen: main angle φ of the tool 1 in the plan of 28.7°, the tool introduction depth t of 0.89 mm, auxiliary angle $\phi_1$=80°, the tool feed S of 1.0 mm. Used as the blank 15 was a copper tube of 18 mm in diameter with a 1.5 mm thick wall. After machining on a lathe the ribbed surface 14 was obtained with alternating ridges 12 and depressions 13 of the required geometric characteristics, the external view of which shaped as an oblique cut of the tube is given in FIG. 7.

The ribbed surface 14 on the tubes is needed for heat exchangers in thermal and atomic power plants, condensers and evaporators in refrigerating and cryogenic machines, for heat supply tubes, steam generators and other heat transfer devices.

Figure 8:
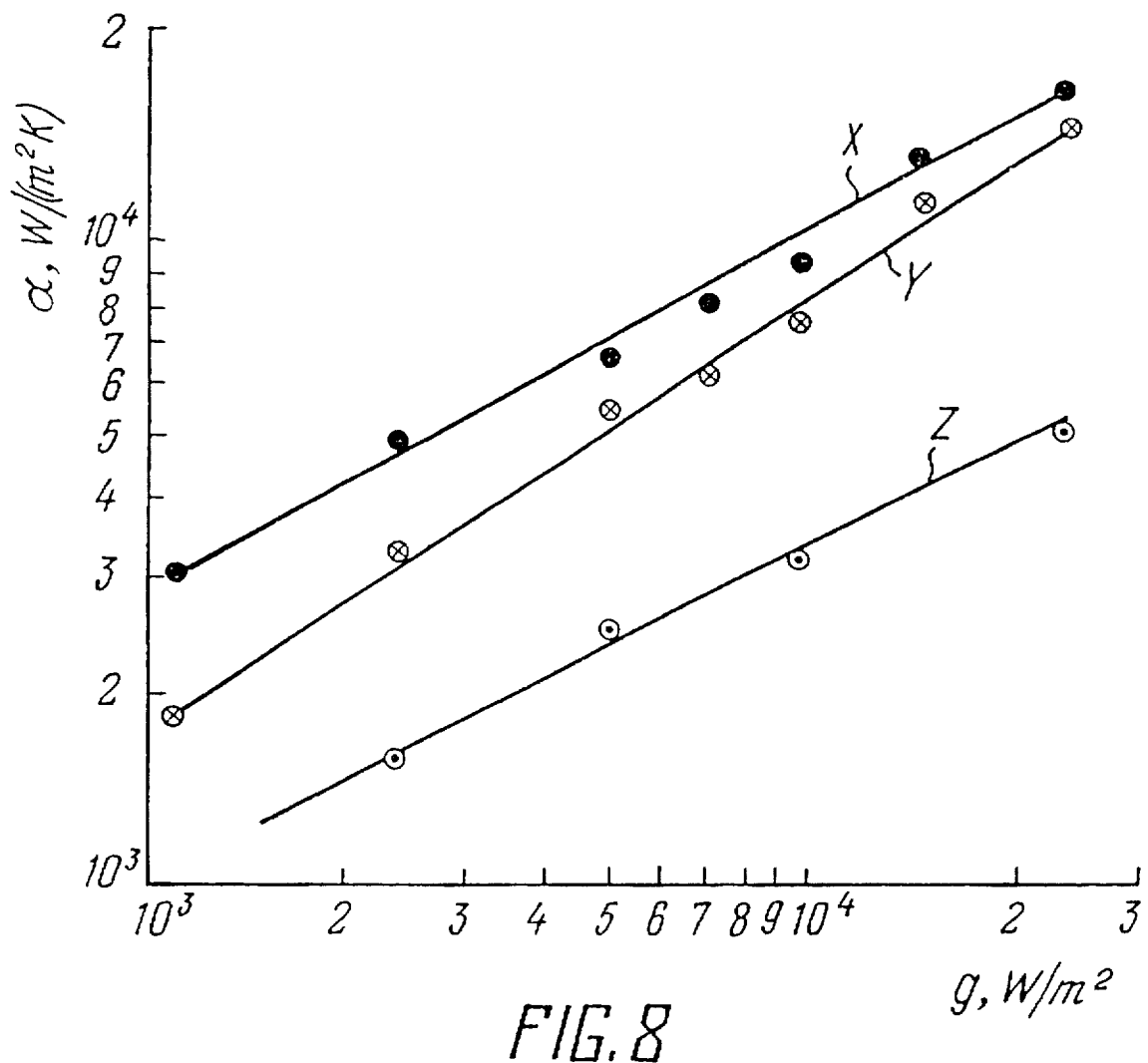
FIG. 8 shows indicators of the heat transfer efficiency of the tube with a ribbed surface.

FIG. 8 shows the relationship between effective heat transfer coefficient α and the density of heat flow q for copper ribbed tubes produced according to the invention when they are used as evaporators in industrial refrigerating units using freon. Graph X is given for the evaporation of pure freon on a copper ribbed tube of a 20 mm initial diameter and the initial thickness of the wall of 2 mm with the following parameters of the ribbed surface, namely, pitch S of the ridges 12 (ribs), the ribbed surface of 0.7 mm, the rib height h of 2.2 mm, rib thickness of 0.32 mm with vertical ribs (ψ=0). Also shown in the graph are the data on thermal efficiency of the tube with ribbing produced through roll-forming on the tube with an analogous initial diameter and thickness of the wall, the parameters of the ribbed surface being S=1.25 mm, h=1.05 mm; a=0.45 mm (graph Y). Graph Z is the relationship of an effective coefficient of heat transfer for an unribbed tube. As evident from the graphs, the effective coefficient of heat transfer for a tube ribbed according to the disclosed method is 25 to 40% higher than for a tube with the ribbing obtained through roll-forming.

Let us consider one more exemplary embodiment of the method.

On a 0.2 mm thick blank 10 of sheet brass it was necessary to produce surface 14 with alternating ridges 12 and depressions 13 (ribbed surface) with parallel sides of the ridges 12 with pitch S equal to 0.19 mm, ridge thickness a of 0.1 mm, ridge height h of 0.44 mm with a vertical position of the ribs ($\psi=0$). It was previously established experimentally that for brass the distortion coefficient $\xi$ of the profile of ridge 12 (rib) is equal to 1.03. According to the invention there were chosen: the main angle of the tool 1 in plan of 30.4°, the depth t of tool introduction of 0.15 mm, auxiliary angle $\phi_1=90°$, the value of tool feed $S_o$ of 0.19 mm.

Figure 9:
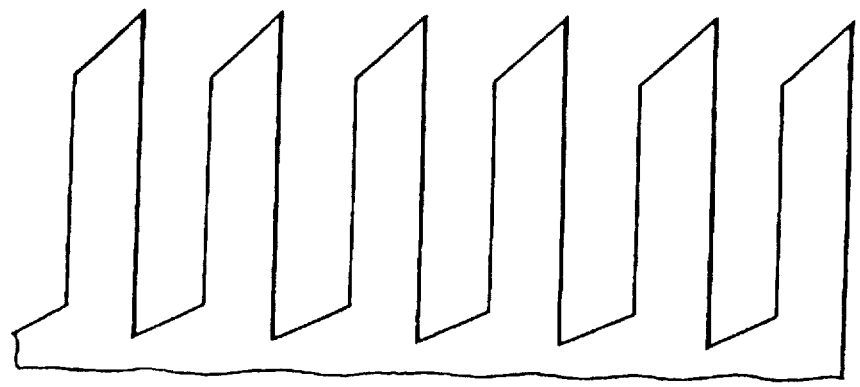
FIG. 9 is the ribbing profile, possessing capillary properties.

FIG. 9 illustrates the profile of the obtained ribbing, magnified 98 times. Such surface having a depression width of 0.09 mm, possesses capillary properties and can be used, e.g., as a fuse structure of the heat supply tube.

In addition to using the ribbed surfaces 14 in heat exchangers, such surfaces can be used to advantage as the base for the application of coatings. For instance, the coating of alumina applied on a piece from low-carbon steel with a ribbed cylindrical surface 14 withstood 16 times more thermal cycles compared to the coating applied on the surface by sand blasting.

The ribbed surfaces 14 with a small width of depressions 13 and ridges 14, not perpendicular to the base, can be used to prepare the piece surface for glueing.

Figure 10:
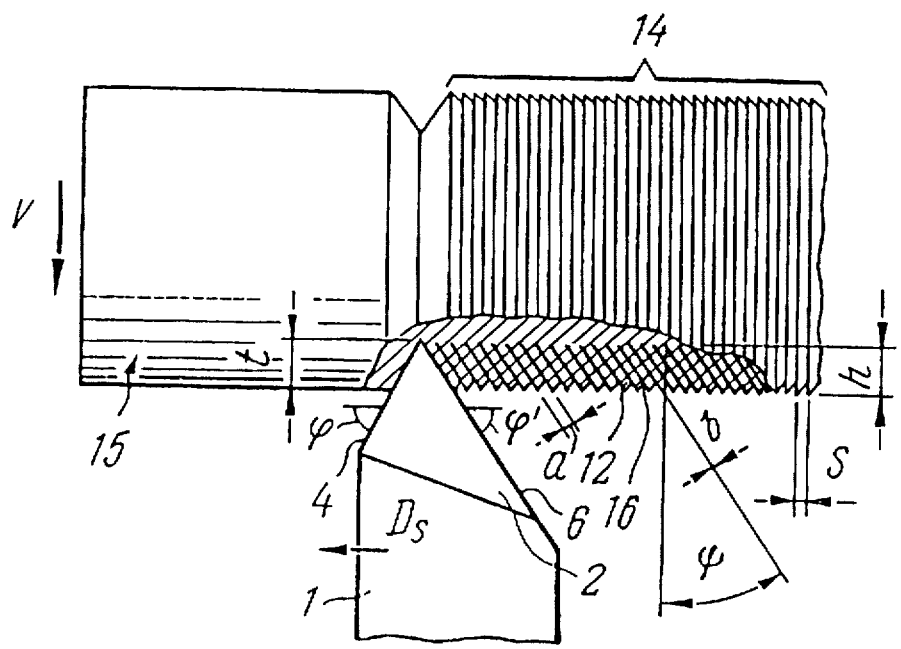
FIG. 10 is the process of obtaining ridges and depressions with parallel sides, essentially, with the zero width of the depressions.

In order to obtain depressions 16, essentially with a zero width b, the main angle $\phi$ in the tool 1 plan is chosen greater or equal to auxiliary angle $\phi_1$ in the tool plan (FIG. 10).

In this case, depressions 16 serve as the interface of the material of the blank 15 surface. Given equality of angles $\phi$ and $\phi_1$, the ribbed surface 14 can be obtained with the width b of depression 6 commensurate with the roughness of the sides of the ridges 12 of the profile. Should angle $\phi$ exceed angle $\phi_1$, the obtained ribbed surface 14 is sealed thanks to additional pressure of the auxiliary edge 6 of the tool 1 on the side surface of the ridge 12 being formed.

The ridges 12 (ribs) deformed during machining, possess higher strength and hardness which allow this method to be used to strengthen the surfaces of parts. Such machining improves the operating properties of parts, e.g., their wear resistance. It is also expedient to provide an additional dimensional machining of the part to the tops of the ridges 12 obtained, e.g., grinding or turning.

Let us consider a specific exemplary embodiment of the method.

On the cylindrical blank 15 it was necessary to make a ribbed surface 14 with depressions 16, essentially, with a zero width b with thickness a of the ridges of 0.19 mm, pitch S of 0.21 mm, height h of the profile of 0.78 mm, angle $\psi$ of the deviation of the projections of 30°. The material of the blank 15 to be machined is corrosion-resistant steel (C=0.12%; Cr=18%; Ni=10%; Ti=1%). It was previously established experimentally that for this steel quality the distortion factor of the profile of the projection 12 (rib) is 1.00. In accordance with the invention there were chosen: main angle $\phi$ of the tool 1 in plan of 60.5°; depth t of the tool introduction of 0.72 mm, auxiliary angle $\phi_1=60°$; the value of tool feed $S_o$ of 0.21 mm.

Figure 11:
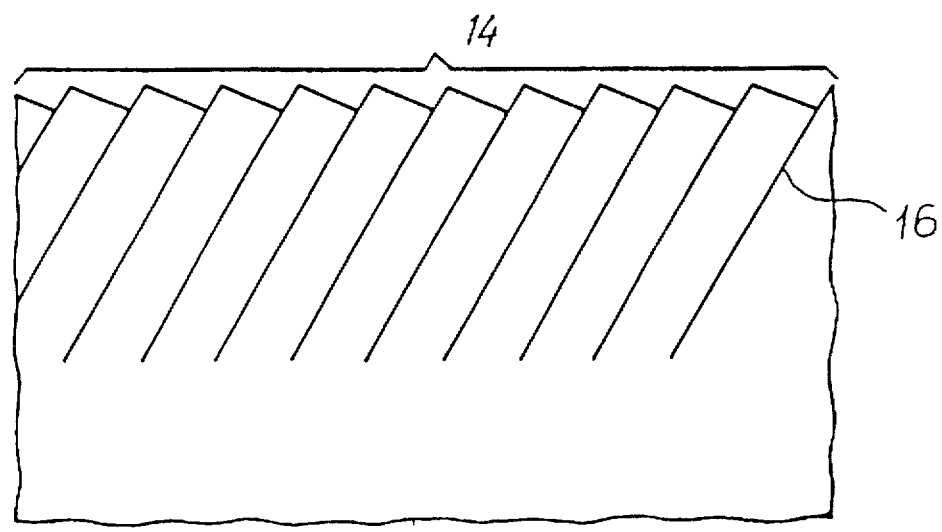
FIG. 11 shows the profile of ridges and depressions on the surface of the machined steel blank in which the depressions have essentially or zero width.

FIG. 11 shows a longitudinal section of the obtained ribbed surface 14 magnified 54 times. Such surface is strengthened and has a greater strength and hardness than the material of the blank which in the given case cannot be subjected to hardening. Other non-hardenable materials, such as copper, aluminium, titanium and low-carbon steels, can be strengthened in an analogous manner.

The interface of the surface layer of the blank material (depressions 16, essentially with a zero width) can be used as ducts for an alloying element to penetrate deep in the blank during subsequent chemical and thermal treatment. This makes it possible to saturate the surface layer of the blank with the diffusion of the alloying element from the sides of the ribs to speed up the provision of doped layers of great thickness.

Figure 12:
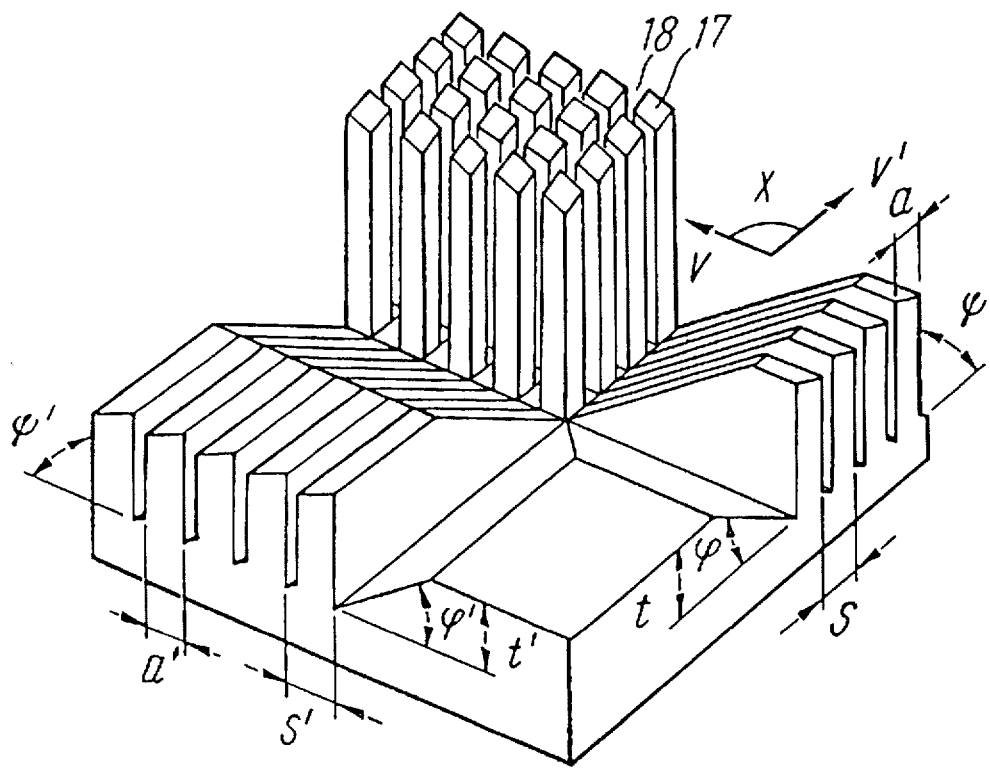
FIG. 12 is the relief of the surface in the form of pins obtained through additional machining.

Having additionally machined the previously ribbed surface 14 with direction V′ of the main motion of the tool 1 at an angle to the direction V of the main motion of the tool 1 during initial machining, it is possible to obtain alternating ridges 17 and cavities 18 on the surface of the blank 10 in the form of pins (FIG. 12).

Additional machining can be effected using the same tool 1 and under the same conditions as the original one. In this case, machining is basically effected twice in two different directions along one and the same surface of blank 10.

Also possible is an exemplary embodiment of the method, whereby during the additional machining as against the original one, at least one of the parameters is changed, namely, the value of feed $S_o$, depth t of the tool introduction, main angle $\phi$ of the tool in plan auxiliary angle $\phi_1$ of the tool in plan.

Thus, it is possible to provide ridges 17 in the form of pins of different shape and size both due to the selection of the mode of machining and geometry of the tool 1, and due to the selection of the direction of additional machining, differing from the direction of the main machining by angle.

Shown in FIG. 12 is an exemplary embodiment of the method in which the additional machining was effected in direction V′ at angle greater than angle $\phi′$ of the original machining, the value $\phi$ of cutting tool feed rate $S_o$ is less than value of the cutting tool feed rate $S_o$ of the original machining. The rest parameters of machining remained unchanged.

The surfaces with ridges 17 in the form of pins have a large area of heat exchange, the shape and size of the pins being chosen subject to the given thermal characteristics of the surface.

These surfaces can also be used to obtain a composition structure by filling depressions 18 with a material having different properties than the material of which the blank is formed. The configuration and the size of the ridges 17 in the form of pins, as well as the filler material are chosen to satisfy a specific technical problem. Besides, the surfaces with the projections 17 in the form of pins can be used as absorbers of acoustic or electromagnetic waves, and as a surface of a catalyst, and for different types of electrodes or as decorative surfaces.

Should a need arise to obtain different geometric parameters on one surface of the blank 15 of the profile with alternating ridges 12 and depressions 13 of differend geometric parameters, at least one of the mode parameters of machining is changed, such as the value of feed $S_o$ and depth t of the tool 1 introduction.

Figure 13:
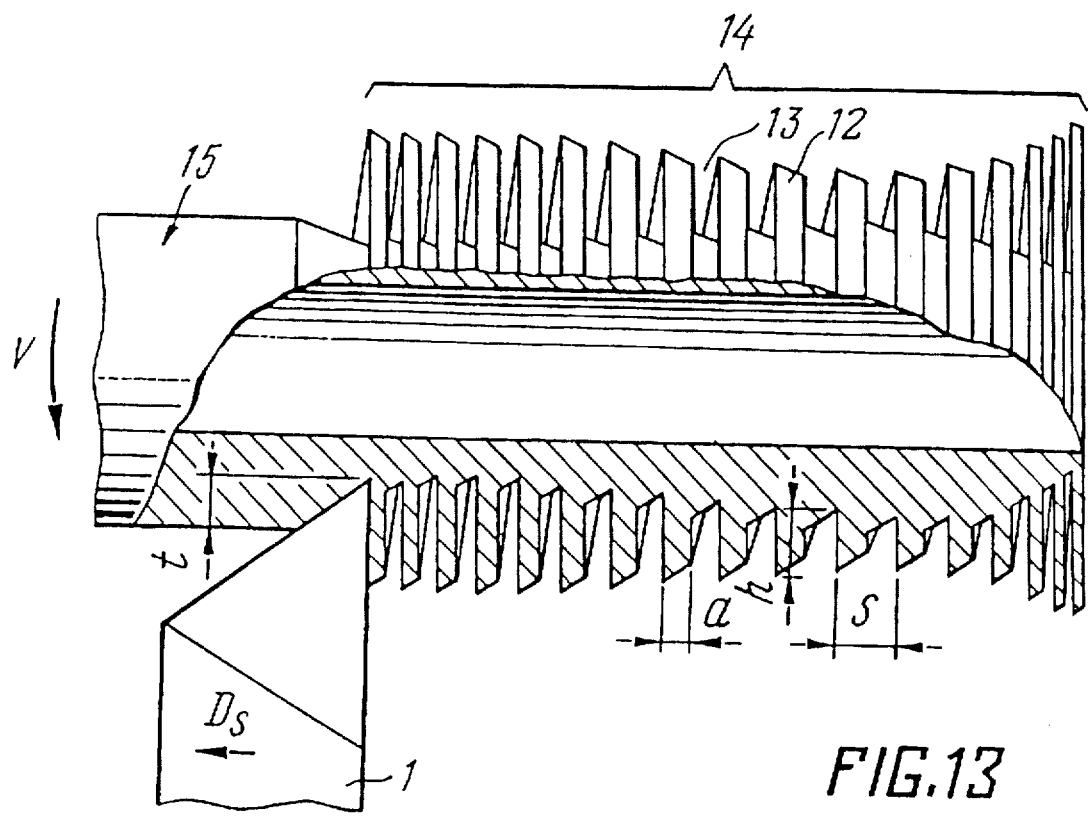
FIG. 13 is the process of making the ribbing with different pitch, thickness and height of ridges on one surface of the billet.

Thus, one can obtain the surface with alternating ridges 12 and depressions 13 of different pitch S, thickness a and height h of the ridges on different sections of the surface of the blank 15 (FIG. 13), e.g., a tube. This ensures an optimal distribution of thermal characteristics along the tube length.

Figure 14:
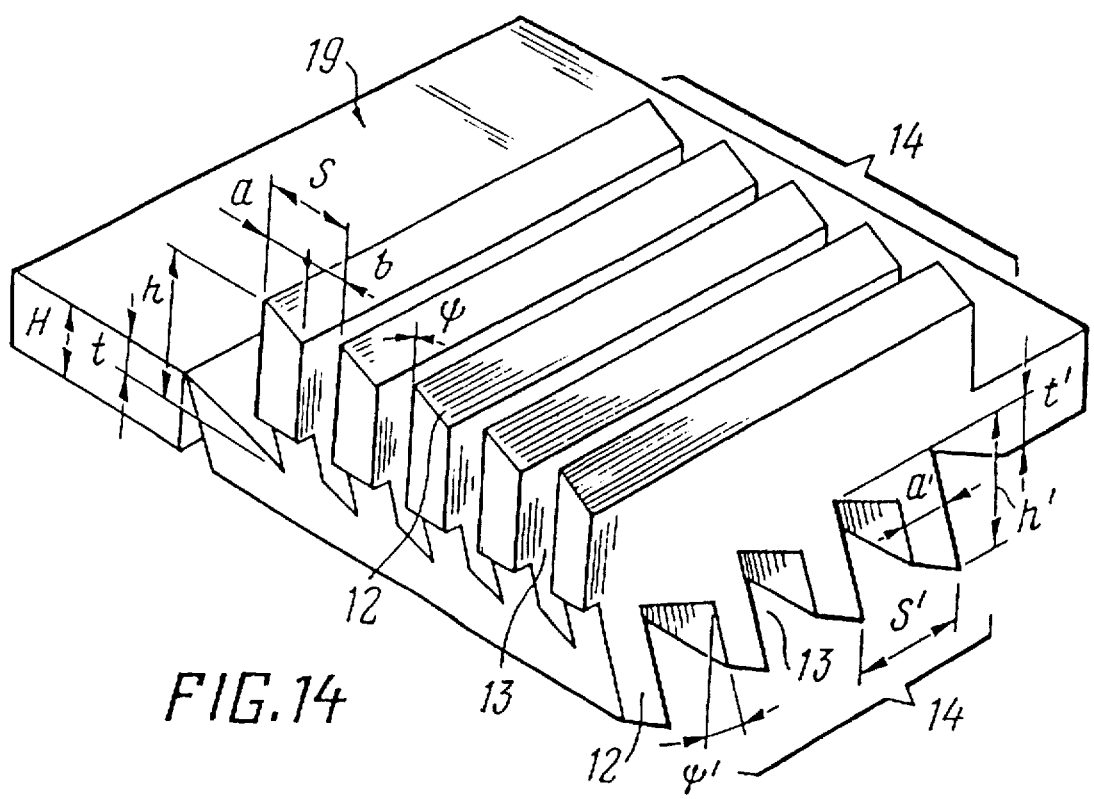
FIG. 14 is a sheet blank after machining from opposite sides.

The method can be used to work a sheet blank 19 from both sides (FIG. 14). In so doing, the directions of the main motion of the tool 1 should not coincide during the machining of each side of the sheet blank 19, and the sum of the values of depths t and t′ of the tool 1 introduction should exceed initial thickness H of the sheet blank 19, as both sides are machined. The modes of machining and geometric parameters of the tool 1 can be different when machining the opposite sides of sheet blank 19.

Such two-sided machining enables one to connect the depressions 13 of the profiles of both sides of the sheet blank 19 (FIG. 14). If the ribbed surface 14 with the depression 13 width of several micrometers is made on one side of the sheet blank 19, the machined sheet blank 19 will be essentially a filtering slit-type surface for fine cleaning. A metal foil or a polymer film with tenths of a millimeter up to several millimeters in thickness can be used as the sheet blank 19. Prior to or after machining, it is expedient that a cylindrical element should be formed from the sheet blank 19, which can be used as a filtering chuck.

Let us consider a specific exemplary embodiment of the method.

It was necessary that ribbed surfaces 14 of the following parameters be made from both sides on a brass sheet blank 19 of 0.30 mm in thickness. For the first side: pitch S=0.02 mm, ridge thickness a=0.012 mm, ridge height h=0.3 mm, with the angle of deviation of the ridges 12 (ribs) from the vertical position $\psi=15$. For the second side pitch $S'=0.22$ mm, projection thickness $a'=0.11$ mm, ridge height $h'=0.5$ mm with the vertical position of the projections 12 ($\psi'=0°$).

For brass the distortion factor $\xi$ of the profile of the ridge 12 (rib) is 1.03. In accordance with the invention in order to machine the first side of the blank 19 there were chosen: main angle $\phi$ of the tool 1 in plan of 35.6°, depth t of the tool introduction of 0.18 mm, auxiliary angle of the tool $\phi_1=75°$, the value of the tool feed $S_o$ of 0.02 mm. To machine the second side there were chosen: main angle $\phi'$ of the tool in plan of 29.0°; depth $t'$ of the tool introduction of 0.20 mm, the tool auxiliary angle $\phi_1'=90°$, the value of tool feed $S_o'$ of 0.22 mm. Thus, the sum total of the depths of the introduction of tool 1, when machining two sides of sheet billet 19, is chosen greater than the initial thickness H of the blank 19 (0.38 mm and 0.3 mm, respectively), to provide the connection of depressions 13 obtained on different sides of the billet 19.

The sheet billet 19, machined on both sides, represents basically a filtering partition for fine cleaning of liquids and gases. The width of the depressions 13 of the ribbed surface 14 of the first side for the example under consideration is 7.3 µm. Because the filtering surface is a slit one, it is possible to readily remove impurities from it, e.g., by way of reversing the direction of the medium being filtered.

Figure 15:
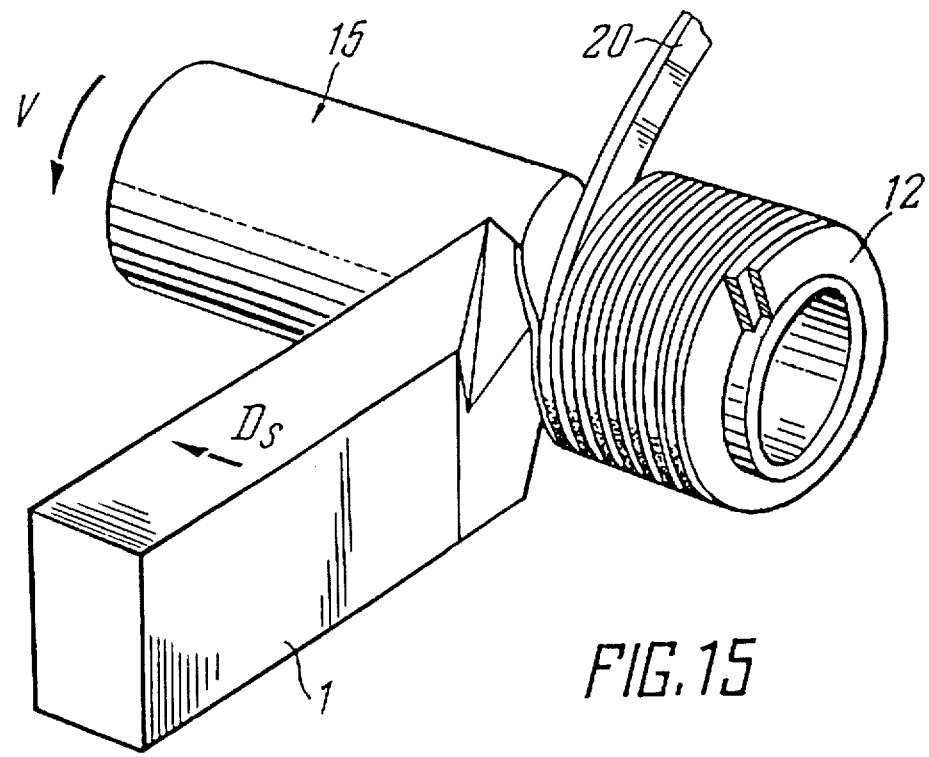
FIG. 15 is a variant of filling the depressions with wire material during machining.

As surfaces 14 with alternating ridges 12 and depressions 13 are being machined or after they are machined, it is possible to partially or fully fill the depressions 13 with a material whose properties are different from those of the material of the blank 15. The material, namely, filler 20 is chosen to satisfy a technical performance objective for the end-product. For instance, for parts operating under conditions of intensive wear, it is expedient that the depressions 13 be filled with a material having high wear resistance, e.g., hardened metal wire of round or rectangular cross-section (FIG. 15). Upon filling the depressions 13, if necessary, it is possible to additionally seal the filler 20 in the depressions 13. It is also expedient that dimensional treatment be carried out, removing the tops of the ridges 12 together with part of the filler 20. Thus, it is possible to obtain, actually, a composition structure of the surface layer of the worked blank 15. For instance, one can produce a layer close in properties to the hardened alloy steel from cheap low-carbon steel on the surface of a machined cylindrical blank 15.

If it is necessary to obtain, e.g., antifriction properties of the surface, the depressions 13 can be filled with fluoroplastic in the form of powder or tape.

It is also possible to galvanically coat the depressions 13 or filling the latter using plasma spraying. In some cases, it is expedient that the depressions 13 be filled with a powder material with or without a binder, e.g., the powders of a solid alloy, or ceramics.

As the depressions 13 are filled during machining, it is possible to seal the filler 20 when the ridge 12 is formed directly due to its deformation.

If necessary, it is possible to provide additional machining by pressure or thermochemical treatment of the surface obtained.

Wire, powder, fibrous and other metal and nonmetal materials may serve as the filler 20.

In the process of obtaining surfaces with alternating ridges 12 and depressions 13, or after machining, one may change the properties of the material of the ridges 12. For example, after machining the material of the ridge 12 may be saturated diffusively to the entire thickness, or it is possible to saturate the sides of the ridges 12 without saturating their central part.

A specific exemplary embodiment of the method.

Figure 16:
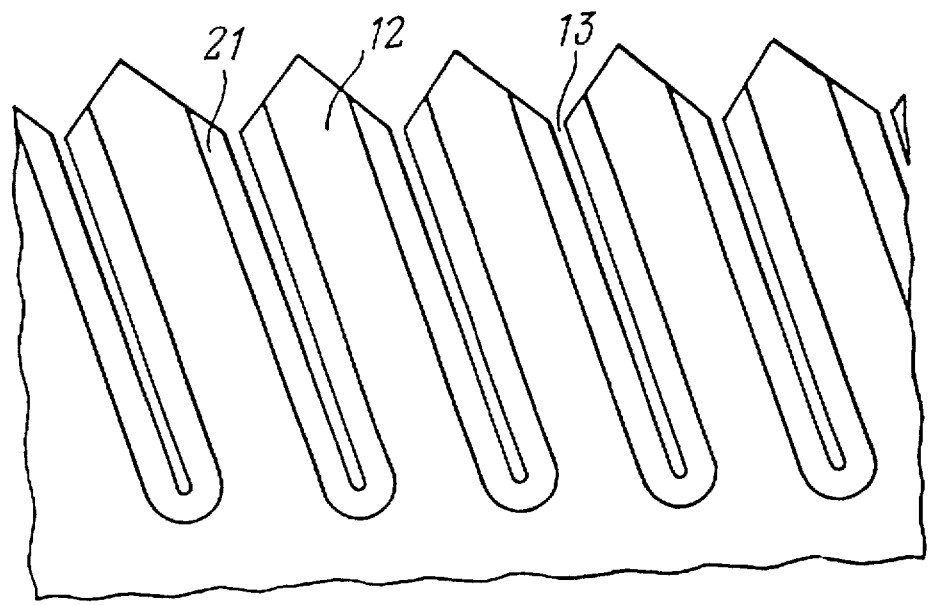
FIGS. 16, 17, 18 are variants of the embodiment of the method with the variation of ridge material properties.

On a cylindrical blank 15 from a corrosion-resisting steel (C—0.12%; Cr—18%; Ni—10%; Ti—1%) a hardened layer should be obtained, consisting of alternating ridges 12 and depressions 13, with the preservation of original mechanical properties of the central part of the ridges 12. The given parameters of the ribbed surface 14 are as follows: pitch S=0.56 mm, thickness of projection a=0.36 mm; height of ridge h=1.5 mm, with the angle of deviation of the ridge 12 (ribs) from vertical position $\psi=15°$. In keeping with the invention, the following parameters of machining are chosen: the main angle $\psi$ of the tool 1 in plan is 39°; depth t of the tool penetration is 0.83 mm; auxiliary angle $\phi_1$ of the tool 1 in plan is 75°; the tool feed $S_o$ is 0.56 mm. Upon provision of the ribbed surface 14, thermochemical treatment was effected in AlCl medium at 1.000° C. for 4.5 hours. As a result of thermochemical treatment a layer 21 (FIG. 16 50× magnification) of Fe Al solution of high hardness, 0.15 mm thick is obtained, the width of the cavity 13 is decreased and the central part of the ridges 12 remains unchanged. Given frictional surfaces of the parts, it is also expedient that the tops of the ridges 12 be subjected to further dimensional treatment, e.g., by grinding. This hardened surface possesses higher wear resistance due to a great hardness of the layer 21, as well as the capacity to withstand impact loads thanks to plasticity of the central part of the ridges 12. Small width depressions 13 may serve as hollows to hold lubricant and to collect wear-out products of the frictional pair.

In certain cases it is expedient that the depressions 13 be overgrown, simultaneously with the alteration of the properties of the depressions 12 material.

A specific exemplary embodiment of the invention.

Figure 17:
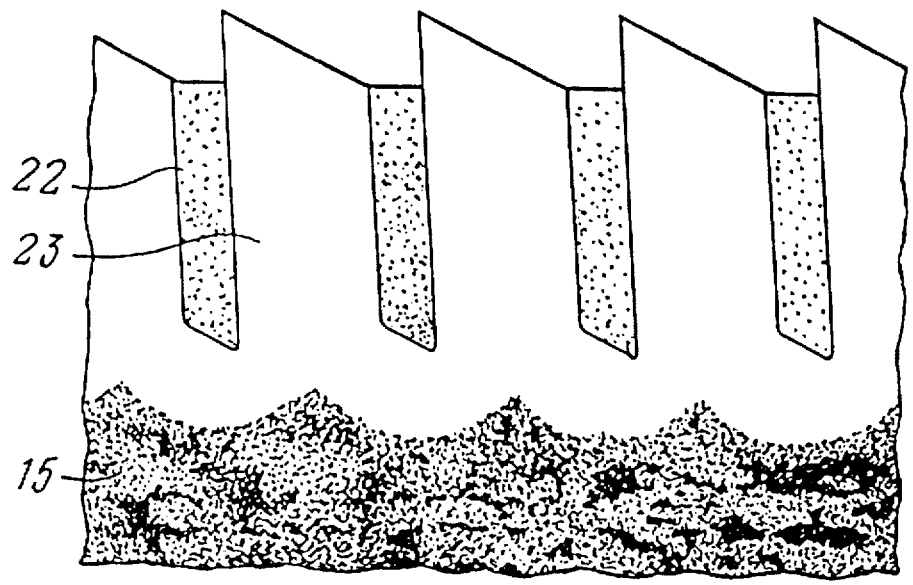

On a cylindrical blank 15 from a low carbon steel (C—0.10%) a corrosion-resistant hardened layer should be obtained. For this purpose, a surface with alternating ridges and depressions was obtained on a cylindrical blank 15, which has the following geometric parameters: pitch S=0.35 mm, ridge thickness a=0.23 mm, ridge height h=0.6 mm, with a deviation angle of the projections 12 (ribs) from vertical position $\psi=5°$. It was established earlier that the ridge 12 (rib) deviation coefficient $\xi$ for such steel is 1.00. In keeping with the invention, the following parameters of machining were chosen to obtain such a surface, namely, the main angle $\phi$ of the tool 1 in plan of 41.1°, the depth t of the tool introduction is 0.3 mm, the auxiliary angle $\phi_1$ of the tool 1 in plan of 85°, the values of feed $S_o$ of the tool is 0.35 mm. Upon the provision of ridges and depressions, thermochemical treatment was effected with diffusive saturation of the ridges (ribs) by chromium to their entire thickness for two hours. After treatment a continuous layer, consisting of alternating high strength intermetallic compounds 22,23 (FIG. 17, 80× magnification) was obtained on the surface of the blank 15.

Let us consider one more specific exemplary embodiment of the method.

Figure 18:
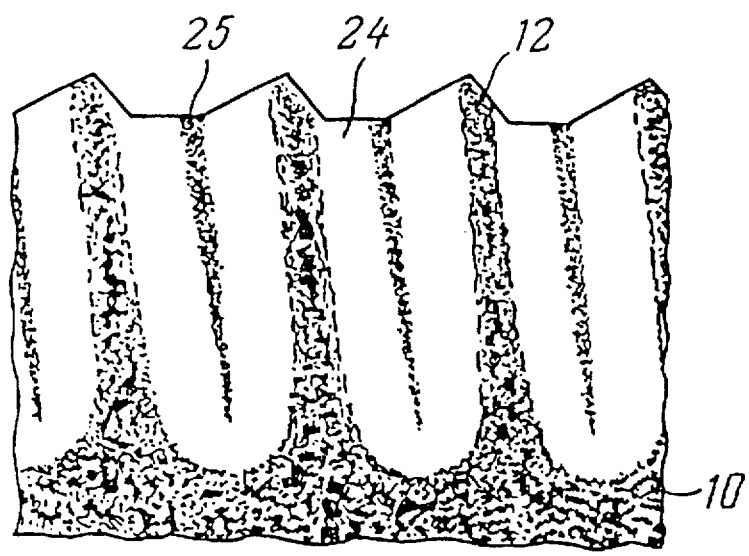

On a flat billet 10 made from a low-carbon hardened steel (C—0.10%) it was necessary to obtain a continuous hardened layer, capable of receiving impacts. For this purpose, a surface was obtained on the blank 10, which has alternating ridges and depressions with the following geometric parameters: pitch S—0.35 mm, proection thickness a=0.25 mm, ridge height h=0.7 mm, with ridge 12 (ribs) deviation angle from the vertical position $\psi=7°$. In order to obtain such a surface, according to the invention, there were chosen the following parameters of machining: the main angle of tool 1 in plan as 45.6°, the depth t of tool introduction as 0.41 mm, the auxiliary angle $\phi_1$ of the tool 1 in plan as 83°, the value of feed $S_o$ of tool as 0.35 mm. Upon the provision of projections and depressions, the thermochemical treatment was effected with diffusive saturation of ridges 12 (ribs) by aluminium for four hours at a temperature of 1,000° C. As a result, a continuous coating is obtained on the surface of the blank 10, which consists of alternating layers of intermetallic compounds 24 (FIG. 18, 80× magnification), hard solution 25 from Fe-Al and the material of blank 10 in the central part of the ridges 12.

In order to obtain ridges 26 (FIG. 19) and ridges 2 (FIG. 20) of different configuration, it is expedient that during treatment at least one of the surfaces be affected, namely, the surface 28 of cutting, the surface 9 to be machined, or a ribbed surface 14 already machined. This effect alters the configuration of these surfaces and can be performed, e.g., by knurling the channeling with the aid of a knurl 29, grooving, embossing recesses or other methods.

The change of configuration of the surface 9 being machined allows the formation of discontinuities on the upper part of the ridges 26.

Figure 19:
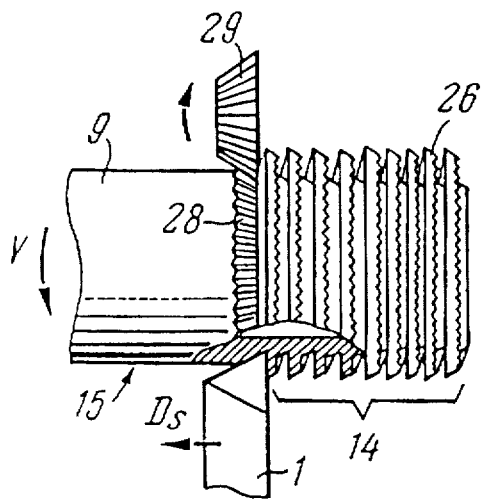
FIG. 19 shows the application of corrugations on the surface of cutting during the provision of ridges and depressions.
Figure 20:
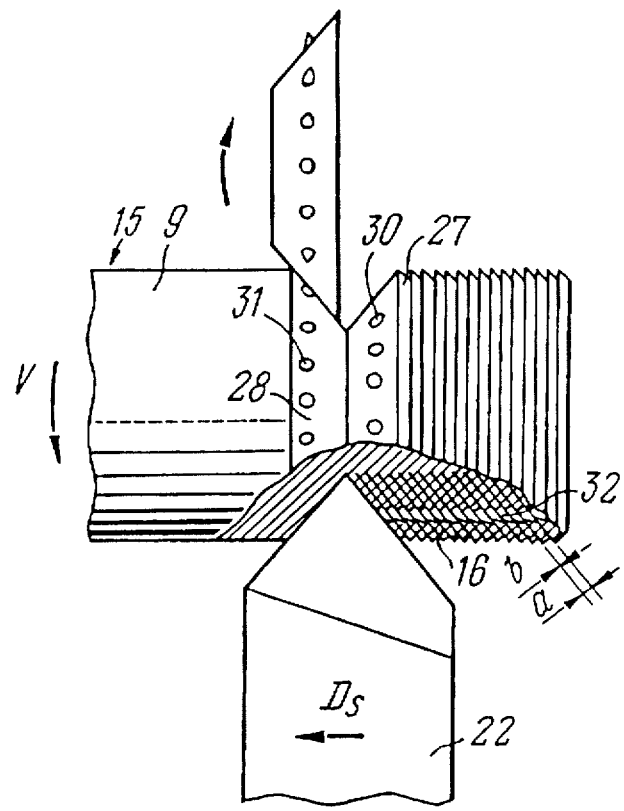
FIG. 20 is the process of making channels beneath the machine surface under the impact of cutting on the surface.

Altering the configuration of the cutting surface 28 makes it possible to vary the configuration of the ridges 26 by way of changing the relief of their sides (FIG. 19).

Changing the configuration of the machined ribbed surface 14 also permits the alteration of the configuration of the ridges 26 by deforming them, e.g., by deforming their tops.

In order to obtain through openings 30 (FIG. 20) on the ridges 27 produced during the main treatment, it is necessary that the depth of proections 31 on the cutting surface 28 be chosen, at least, equal to the thickness of the ridges 27 being formed. Given the combination of this method with that of producing the ridges 16, essentially of a zero width, it is possible to obtain rectilinear, or spiral channels 32 under the surface of the treated blank 15.

Figure 21:
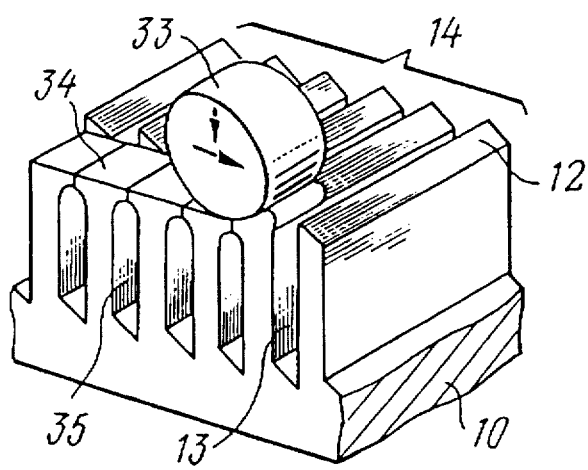
FIG. 21 is the process of making channels beneath a flat surface of the blank as the ridge tops are deformed.

In order to decrease the width of the depression 13 (FIG. 21), in its top part it is necessary immediately in the process, or after machining, the tops of the ridges 12 be plastically deformed, e.g., by a cylindrical roll 33, a spherical smoother, metal brushes or any other prior art technique. Given such machining, platforms 34 are formed on the tops of the ridges 12. In certain cases, it is expedient that the tops of the ridges 12 be deformed until the sides of the platforms 34 tightly contact each other. In this case, it is possible to obtain the channel 35 under the surface of the flat 10 or cylindrical 15 worked billet.

A specific exemplary embodiment of the method.

Figure 22:
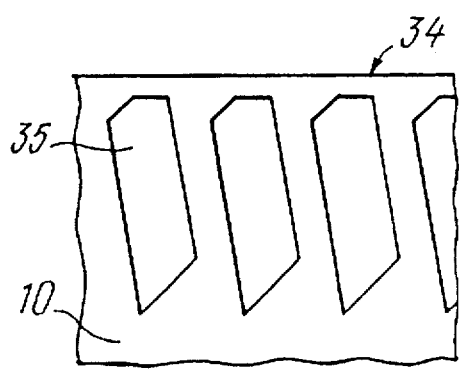
FIG. 22 is the profile of the channels obtained under the blank surface.

It was necessary to produce rectilinear channels 35 under a flat surface of the copper blank 10. The channels 35 were obtained in two stages upon treatment by a planing machine. At the first stage a ribbed surface 14 was obtained on the surface of the blank 10 with the following geometric parameters: pitch S=1.4 mm, ridge thickness a=0.8 mm, ridge height n=4.3 mm, with a vertical position of the ridge 12 ($\psi=0$). In order to obtain such a ribbed surface 14, in keeping with the invention, the following parameters of machining were chosen, namely, the main angle $\phi$ of the tool 1 in plan as 33.3°; the depth t of tool penetration as 2.1 mm; the auxiliary angle $\phi_1$ of the tool 1 in plan as 90°, the value of feed $S_o$ of the tool as 1.4 mm. In the second stage the tops of ridges 12 are deformed by a spherical smoother over four runs along the ridges 12 (ribs) with the value of discrete feed $S_o=0.7$ mm. As a result, there are obtained the channels 35 under a flat surface of the blank 10, the profile of which is given in FIG. 22 with a 4.7× magnification. Upon the formation of a reflecting surface, such machined blank 10 can be used as a cooling mirror of a powerful laser.

Figure 23:
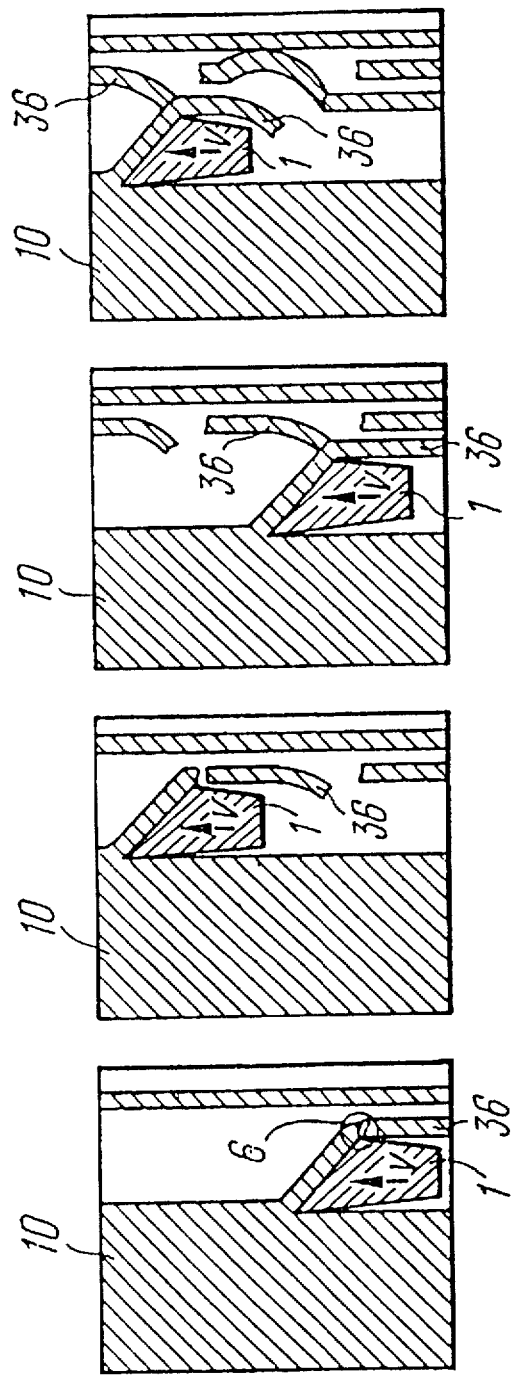
FIG. 23a,b,c,d is the process of producing the relief in the form of cells on the blank surface.

In order to obtain the relief on the surface in the form of a periodically arranged cells (depressions) made up by ridges 36 (FIG. 23) with curvilinear sides, it is necessary to periodically break up lengthwise the ridges 36 being formed (FIG. 23a). The tool 1 serves to disrupt the ridge 36 (ribs) in the zone of its auxiliary edge 6 due to providing limiting tensile stresses in the ridge 36. As the tool 1 moves further, one of the ends of the ridges 36 is separated from the blank 10 and this end of the ridge 36 is bent toward the tool 1 (FIG. 23b). The end of the ridge 36 is bent due to the difference of stresses occurring along the ridge 36 at its opposite sides. As the ridge 36 is formed during the subsequent run of the tool 1 (FIG. 23c), the previously bent end of the ridge 36 comes into contact with the side of the ridge 36 being formed to disrupt the ridge 36 being formed precisely in the place of contact. As the tool 1 moves further, the ridge 36 being formed makes contact with the other bent end of the ridge 36 formed during the previous run of the tool 1 to provide a subsequent disruption of the ridge 36 also in the place of contact (FIG. 23d).

Figure 24:
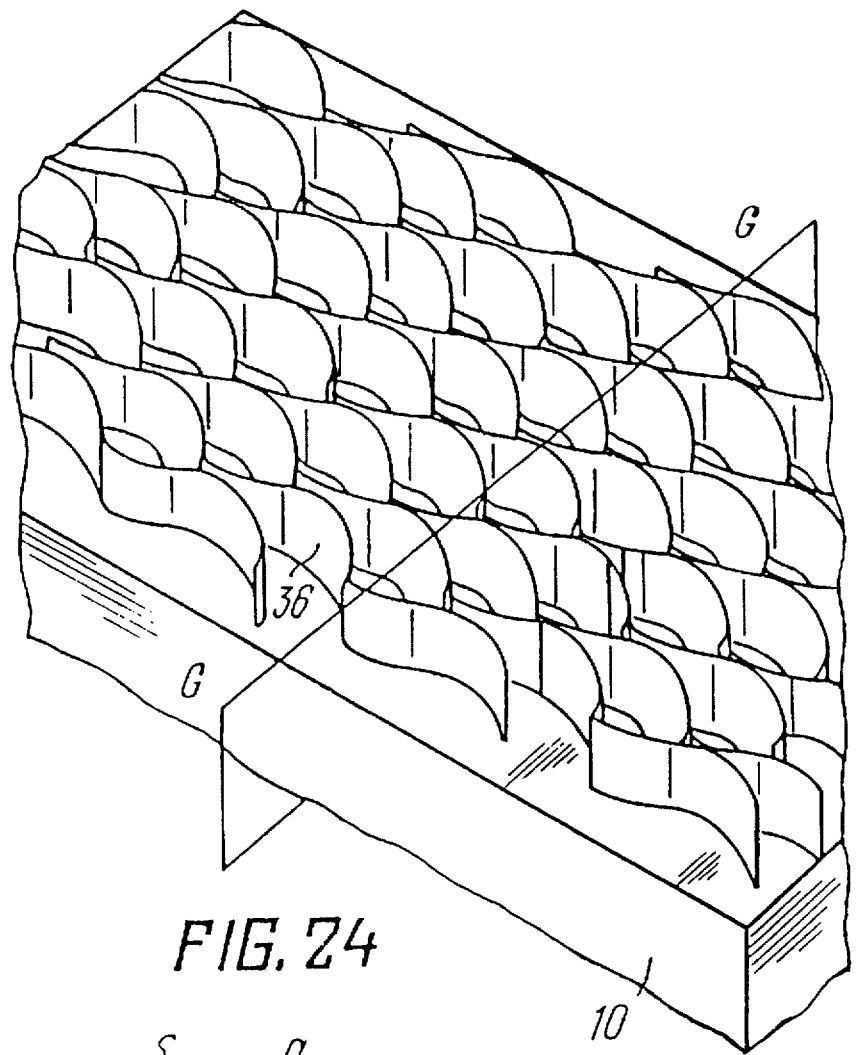
FIG. 24 is the external view of the relief in the form of cells on the blank surface.
Figure 25:
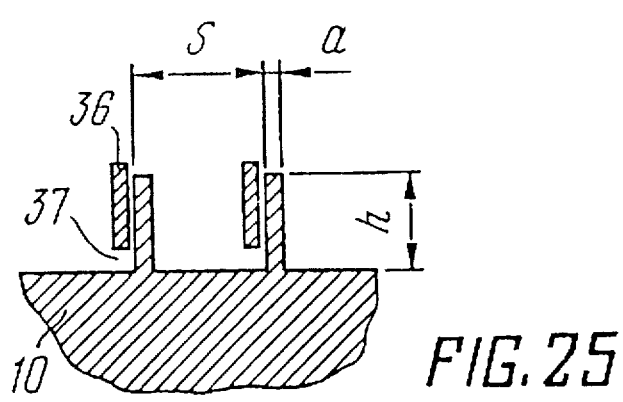
FIG. 25 is the cross-section by plane G as in FIG. 24.

The external view of the relief in the form of cells on the surface of the blank 10 is given in FIG. 24. Upon the disruption of the ridge 36 and the bending of its end, the bent end of the projection 36 is separated from the blank 10 with the formation of a gap 37 (FIG. 25). The plurality of gaps 37 in the lower part of the ridges 36 obtained on the machined surface of the blank 10 ensures the permeability of the relief for liquids in different directions and not only along the ridges 36.

The cell-shaped relief possesses capillary properties and can be used as a rosin-core (cored) structure of heat tubes. The permeability of such relief in different directions allows, compared to the ribbed surface 14, a more uniform distribution of a working liquid across the entire surface of the heat tube. The relief can also be used in the form of cells as the surfaces of evaporation and condensation.

One of the sides of the relief ridges 36 is mirror-bright, and the opposite side is lusterless. Thus, the relief in the form of cells also possesses a decorative effect.

Let us consider a specific exemplary embodiment of the method.

It was necessary that a relief of uniformly arranged cells formed by ridges 36 with curvalinear sides should be obtained on a cylindrical copper blank 15. The required thickness of ridges a=0.2 mm, the ridge pitch S=0.4 mm, relief height h=1.1 mm, with vertical arrangement of the ridges 36 ($\psi=0$). According to the invention, the following conditions of machining were chosen. The tool 1 main angle $\phi$ in plan as 28.7°, the tool penetration depth as 0.47 mm, the tool 1 auxiliary angle $\phi_1$ in plan as 90°, the tool feed $S_o$ as 0.40 mm. As a result, a required surface with the cell-shaped relief was obtained.

Figure 26:
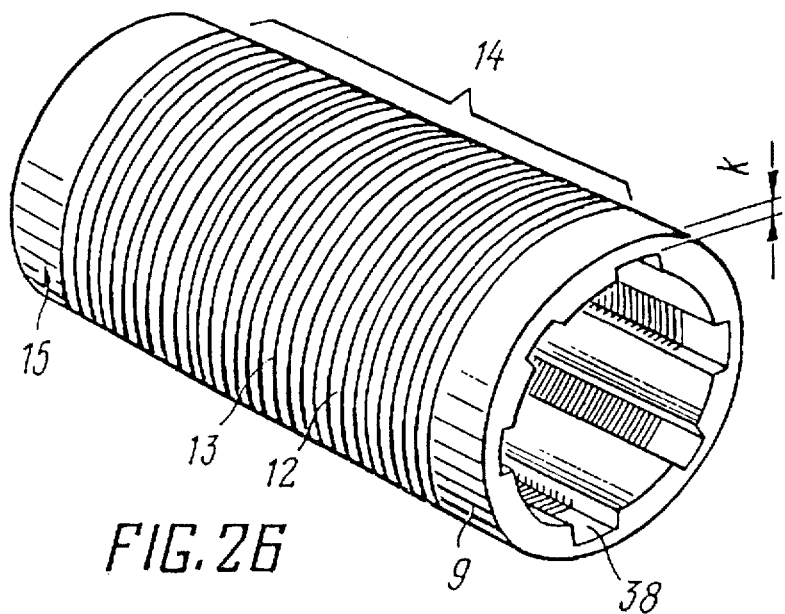
FIGS. 26, 27, 28 are the embodiment variants of the method with the formation of depressions on the blank prior to or after making the ribbed surface.
Figure 27:
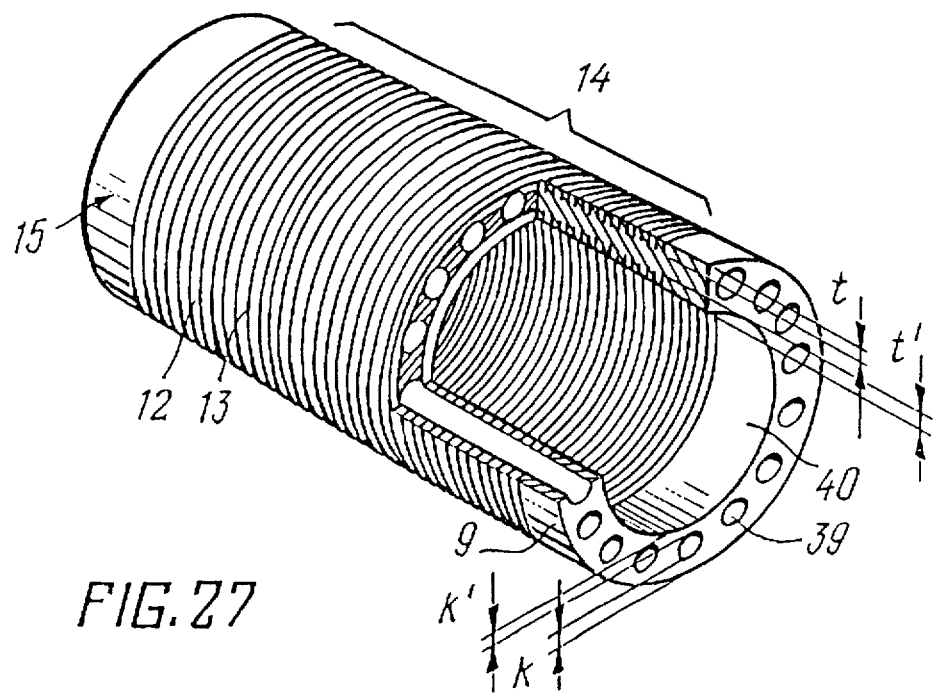
Figure 28:
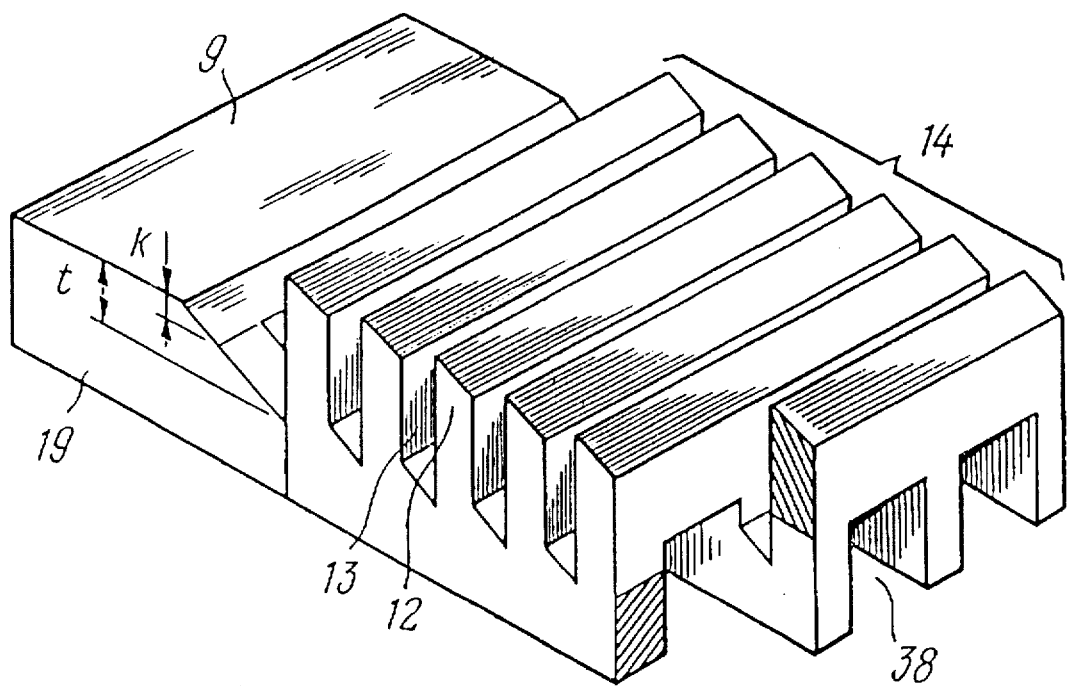

In order to obtain filtering partitions and fire shields, it is also expedient that internal depressions 38 (FIGS. 26, 28) and internal depressions 39 (FIG. 27) be formed prior to the provision of ribbed surface 14 on the cylindrical 15 or sheet 19 blank, or after machining.

Given the formation of recesses 38,39 prior to machining, the distance K from the machined surface 9 to the depression 38 or 39 (FIGS. 26, 27) is less than the depth t of the tool 1 penetration.

In case the recesses 38,39 are formed after machining, these recesses communicate with the depressions 13 (FIG. 28) of the previously machined surface from the side opposite to the machined one.

The receses 38,39 can be obtained by way of machining, plastic deformation, electro-erosion treatment, etching or other prior art methods.

When obtaining the recesses 38,39 after the production of the ribbed surface 14, it is necessary to ensure the absence of plastic deformation of the material in the zones of connection of the recesses 38,39 with the depressions 13 of the previously obtained relief. This is achieved by choosing a respective method of producing the recesses 38, 39, e.g., through etching.

It is possible to produce such filtering partitions also from polymers, e.g., fluoroplastic.

Let us consider a specific exemplary embodiment of the method.

It was necessary that the ribbed surface 14 (FIG. 26) designed for filtration should be obtained on the cylindrical blank 15 from fluoroplastic. The required parameters of the ribbed surface 14 are as follows: the ridge thickness a=0.22 mm, the ridge pitch S=0.03 mm, the relief height h=2.2 mm; projection 12 (rib) deviation angle $\psi$ from the vertical position is 10°. It was established previously that the distortion coefficient $\xi$ of the profile of the ridge 12 (rib) for fluoroplastic is 1.07. According to the invention, the following conditions of machining were taken: the main angle $\phi$ of the tool 1 in plan is 43.2°; the depth t of the tool penetration is 1.63 mm, the auxiliary angle $\phi_1$ of the tool 1 in plan is 80°, the tool feed $S_o$ is 0.02 mm.

First, the recesses 38 shaped as longitudinal grooves were formed on the inside of the tube blank 15 so that the thickness of the wall between the surface 9 being machined and the recesses 38 was K=1.4 mm, in so doing, according to the invention, the value K is chosen less than the depth t of the tool 1 penetration. Upon the provision of the ribbed surface 14 on the external cylindrical surface of the blank 15 the depressions 13 between the ridges 12 began to communicate with the previously obtained recesses 38.

The thus machined blank 15 is, actually, a filtering chuck. The alternating depressions 13 of the ribbed surface 14, whose width in the given example is 7.5 m, permits the filtration of the medium with the fineness of cleaning equalling the width of the depressions 13 of the ribbed surface 14. The filtered-off medium can be collected via the recesses 38 into an internal part of the machined round blank 15.

In order to increase the area of the filtering surface it is expedient the round blank 15 (FIG. 27) be machined from the external 9 and internal 40 surfaces being machined, and the recesses 39 should be formed beforehand in the wall of the round blank 15, e.g., by drilling holes. As the recesses 39 are produced, the values k and k' are chosen less than the respective depths t and t' of the tool 1 penetration for the external 9 and internal 40 machined surfaces of the round blank 15. In the given example the filtered-off medium is collected to previously formed recesses 39.

Figure 29:
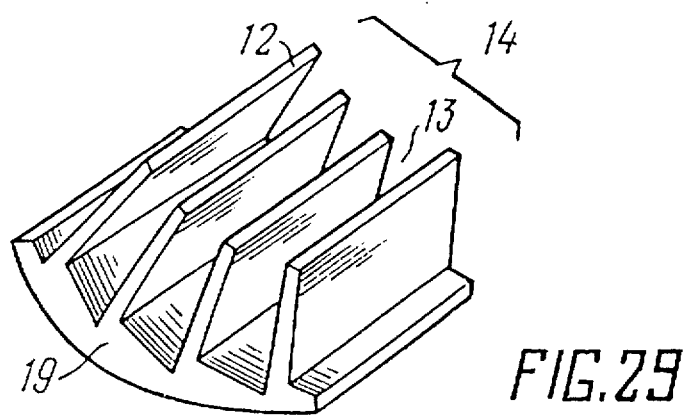
FIG. 29 is an embodiment variant of the method with additional deformation of the machined blank.

Prior to and after machining of the blank 19 it is possible to subject it to elastic or plastic deformation, e.g., once machined, the sheet blank 19 can be bent towards the ribbed surface 14 (FIG. 29). It is expedient for the regulation (in the given case—decrease) of the width of the upper part of the depressions 13 between the ridges 12 of the ribbed surface 14, given it is used as a filtering partition. The bending of the machined blank 19 to the side opposite the ribbed surface 14 is expedient, e.g., for improving the cleaning of the filtering ribbed surface 14.

Figure 33:
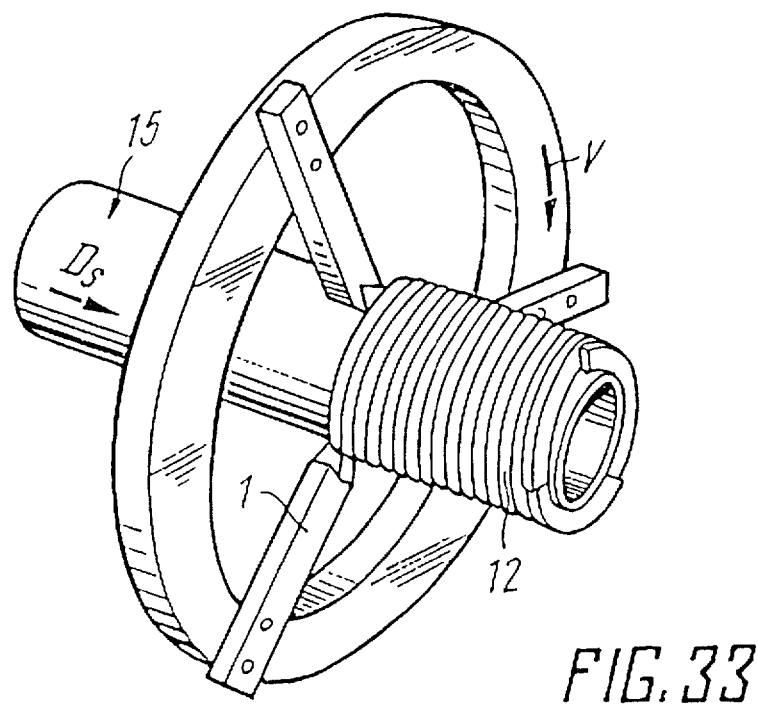

It is possible to obtain a relief on the cylindrical 15 (FIGS. 30, 33) or flat 10 (FIGS. 31, 32) blank, imparting a rotary main movement V to one or several tools 1.

Simultaneous use of a number tools 1 makes the machining more efficient.

Imparting rotation to one or several tools 1 expands the possibilities of the method for producing ridges and depressions of different configuration.

Figure 30:
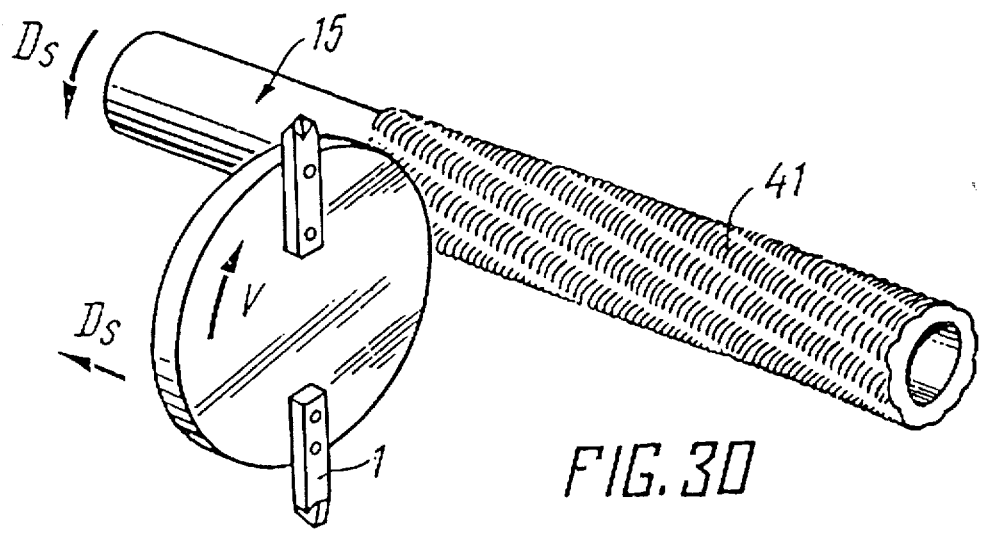
FIGS. 30, 31, 32, 33 are embodiment variants of the method during the main rotary motion of the tools.
Figure 31:
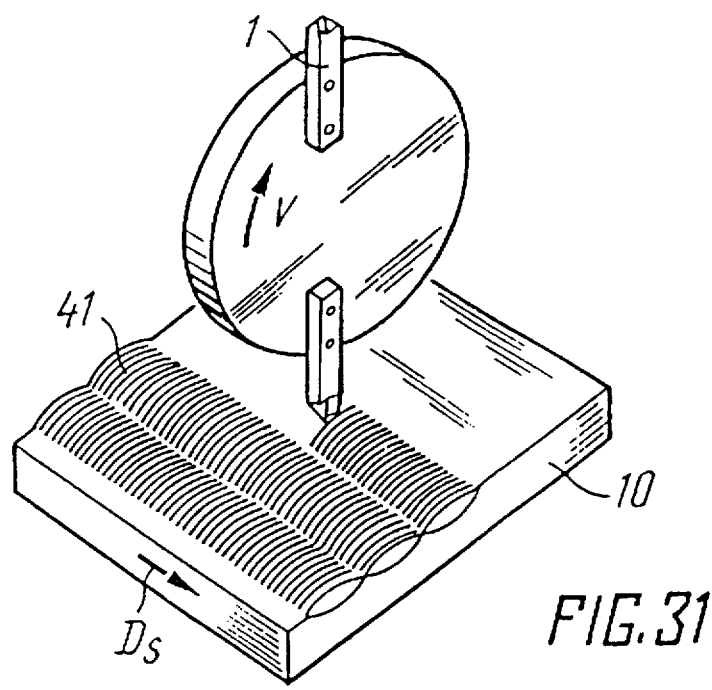
Figure 32:
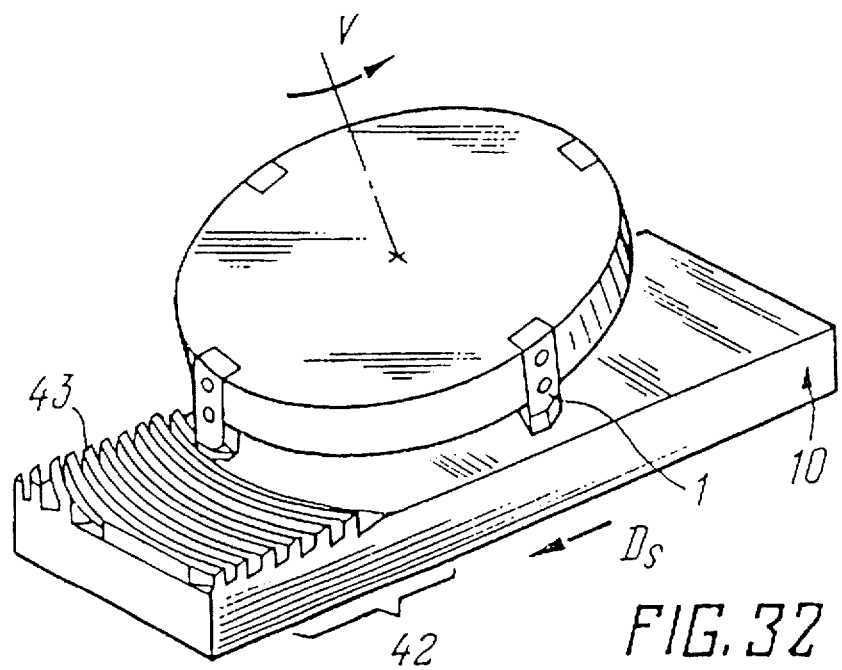

FIGS. 30, 31 illustrate the exemplary embodiments of the accomplishment of the method for machining the cylindrical 15 and flat 10 blanks, respectively. In this case, it is possible to obtain ridges 41 in the form of petals with a variable height of the ridge 41 lengthwise, in so doing, as the machining parameters are selected, it is the maximum height of the ridges 41 that is used as the assigned one. The length of the ridges 41 is determined by the combination of the kinematic parameters of machining.

When machining the cylindrical blank 15 (FIG. 30) a number of petal-shaped ridges 41 located along the generatrix of the blank 15, or spirally, may be obtained by selecting the combination of the frequencies of rotation of the blank and tools.

When a flat 10 (FIG. 31) is machined, the length of the petal-shaped ridge 41 is regulated by altering the radius of the tools 1 rotation. Given several tools 1 with a different radius of rotation, it is possible to obtain alternating petal-shaped ridges 41 of different length and height.

To make the production of the ribbed surface 42 (FIG. 32) on a flat blank 10 more efficient, it is expedient the machining be done by tools 1, whose axis of rotation is perpendicular to the surface 9 being machined, or inclined. Given a great radius of the rotation of tools 1 and a small radius of the surface 9 being machined, the ridges 43 of the ribbed surface 42 will differ litle from the rectilinear ones.

When machining with several tools 1, rotating around the cylindrical blank 15, it is possible to obtain several ridges 12 (FIG. 33) simultaneously. In this case the productivity of machining is increased in proportion to the number of tools 1 used.

Provided many tools are used, as the parameters of machining are chosen, the feed $S_o$ is increased in proportion to the number of the tool 1 used.

Figure 34:
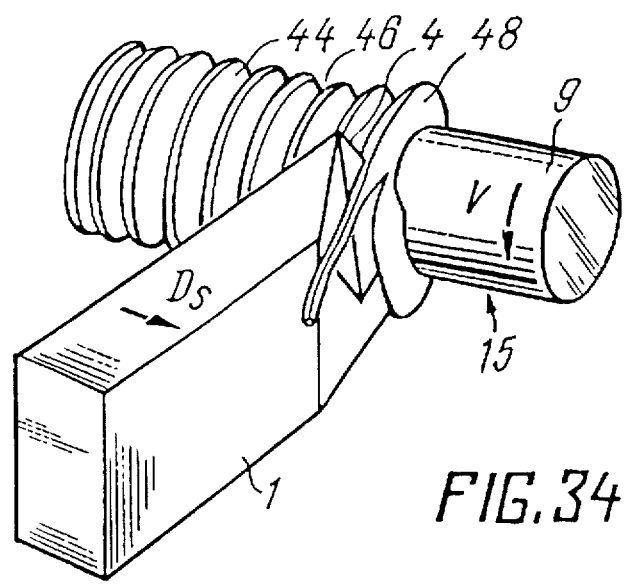
FIG. 34 is the general view of the process of producing ridges and depressions of a triangular profile.

The disclosed method can be used to produce ridges 44,45 (FIGS. 34, 35) and depressions 46,47 of a symmetric and asymmetric triangular profile, the tool 1 being fed towards the side opposite the cutting edge 4. In this case, the undercut layer 48 is deformed, being extruded to the machined surface 9 of the blank 15. During the next run of the tool 1, its main edge 4 not only cuts the layer of the blank 15 material, but simultaneously cuts off part of the material of the ridge 44,45 obtained over the previous run. Given a definite relationship between the depth t of the tool 1 penetration and its feed $S_o$, the minimal volume of the previously obtained ridge 44,45 is cut off, ensuring a full triangular profile of the ridge 44,45.

Figure 35:
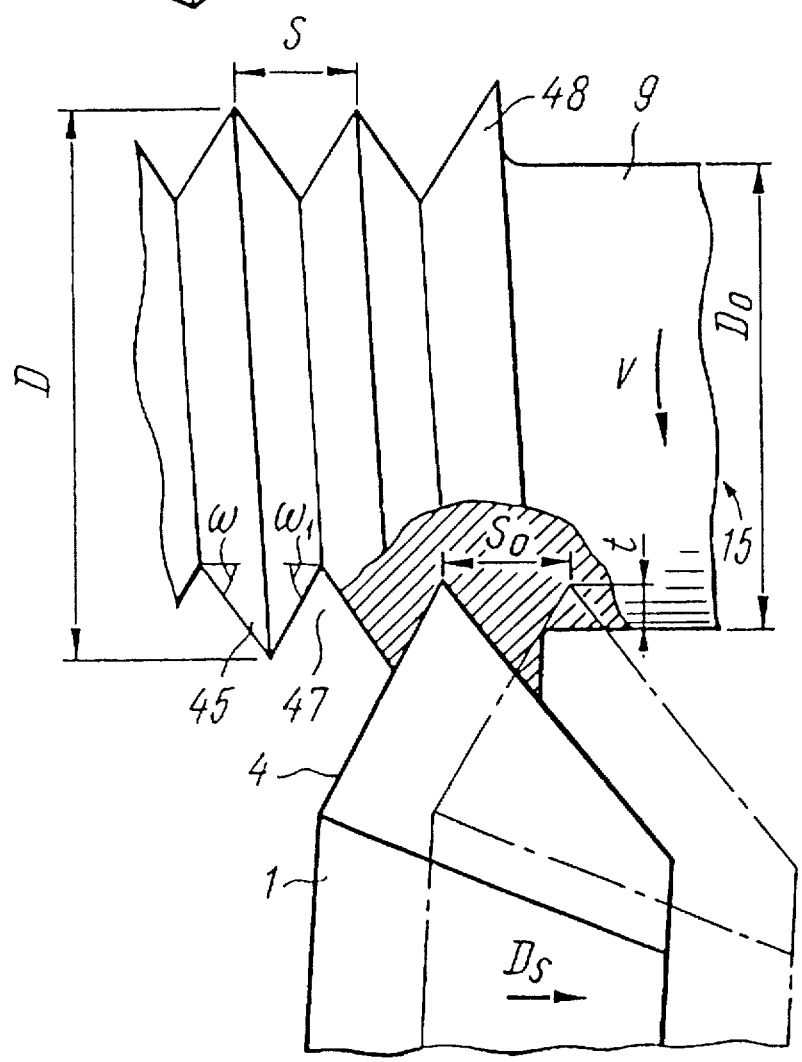
FIG. 35 is the process of producing an assymetrical triangular profile.

The asymmetric triangular profile of the ridge 45 is assigned by angles $\omega$ and $\omega_1$ of the inclination of the sides of the ridges 45 and the pitch S of the ridges 45 of the profile (FIG. 35).

For such profile the depth t of the tool 1 penetration should be at least:

$$t = S/(ctg\,\omega + ctg\,\omega_1 + \sqrt{2ctg\,\omega \cdot ctg\,(\omega/2 + \omega_1/2)}\,],$$

given the value of feed $S_o$ of the tool 1 is equal to the assigned pitch S of the triangular profile.

Let us consider a specific exemplary embodiment of the method.

Using a flat blank 10 from annealed bearing steel (C=1%, Cr=1.5%) it was necessary to obtain a triangular profile of the ridges 45 with pitch S=0.5 mm, the angles of the slope of the sides of the ridges 45 with pitch S≤0.5 mm, slopes of the sides of the ridges of $\omega$=40°, $\omega_1$=80°. In accordance with the invention, there were chosen: the main angle of the tool 1 in plan view as $\phi$=80°, the auxiliary angle of the tool 1 in view as plan $\phi_1$=40°, the feed $S_o$=0.5 mm, the tool penetration depth t=0.20 mm. The direction of feed $D_s$ is chosen to the side opposite the cutting edge 4 of the tool 1. The machining was effected by a planing machine. After machining there was produced a relief with ridges 45 of a triangular profile of the given parameters. Once hardened, this machined surface of the blank 10 can be used as the working surface of a tool, e.g., a file.

The surface with the alternating ridges 45 and depressions 47 of an asymmetric triangular profile made on the cylindrical blank 15 can be also used as a buttress thread.

The symmetric triangular profile of the ridges 44 (actually threaded) is assigned by an angle β between the sides of the ridges 44 for an external thread profile, or between the side of the depression 46 for an internal thread profile, the pitch S of the profile, as well as by diameter D along the tops of the ridges 44 for the external thread profile and diameter D along the depressions 46 for the internal threaded profile.

In this case, the depth t of penetration of the tool 1 to obtain an external and internal thread is chosen at least:

$$t=0.29S\cdot ctg\,(\beta/2),$$

and the initial diameter D of the blank 15 for obtaining the external tread profile is chosen to be equal to:

$$D_o=D-0.71S\cdot ctg(\beta/2),$$

Let us consider a specific exemplary embodiment of the method.

It was necessary that a thread symmetric triangular profile of the ridges 44 should be produced on the external surface of the cylindrical blank 15 from aluminium with angle β between the sides of the ridges 44° being 60°, the pitch S of the ridges 44 being 2.5 mm, the external diameter D along the tops of triangular ridges 44 being 20.27 mm. According to the invention, the tool 1 penetration depth t is 1.26 mm, the outside original diameter D of the cylindrical blank 15 is 17.19 mm, the main $\phi$ and $\phi_1$ auxiliary angles in plan of the tool 1 are equal to 60°, the feed S of the tool 1 is 2.5 mm. The direction of feed $D_s$ is chosen to the side opposite the cutting edge 4 of the tool 1. It is desirable to provide an additional machining (turning or rounding off) of the tops of the obtained ridges 44 up to the outside diameter of 20 mm. This profile is a standard thread metric profile of a normal pitch with an outside diameter of thread equalling 20 mm. Given such thread is produced by a conventional method, e.g., a cutter, the initial diameter of the blank should be 20 mm, which is greater by 2.02 mm than the initial diameter (17.98 mm) of the blank 15 chosen according to the invention. This allows the material removed in the form of chips or cuttings to be reduced in volume. For example, for the case in point this reduction is about 40%.

In order to obtain an internal symmetric thread profile of the ridges 44, the initial inside diameter $D_2$ of the blank 15 is chosen to be:

$$D_2=D_1-0.59S\cdot ctg(\beta/2),$$

Let us consider a specific exemplary embodiment of the method.

It was necessary that a thread triangular profile be produced on an internal surface of the cylindrical blank 15 from titanium with an angle β between the sides of the depressions 46° being 60°, the pitch S of the ridges 44 being 2.5 mm, the inside diameter $D_1$ along the depressions 46 being 20.54 mm. According to the invention, the depth t of the tool 1 penetration is 1.26 mm, the initial inside diameter $D_1$ of the cylindrical blank 15 is 17.98 mm, the main $\phi$ and auxiliary $\phi_1$ angles in the plan of the tool 1 are 60°, the feed S of the tool 1 is 2.5 mm. The direction of feed $D_s$ is chosen to the side opposite the cutting edge 4 of the tool 1. The machining resulted in a required triangular profile of the ridges 44 on the internal surface of the blank 15. After additional machining (boring) of the tops of the ridges 44 up to a diameter of 17.29 mm a profile was obtained along the tops of the ridges 44 which is actually a standard internal metric thread of a normal pitch.

In addition to the economy of metal, the thread profile is produced at once to the entire depth of the profile over one run of the tool 1 along the surface 9 of the blank 10 being machined. It is unfeasible when making threads of a large pitch, e.g., using a cutter, especially on highly formable materials, such as copper, aluminium, corrosion-resistant steels. Because the ridges 44,45 of the obtained triangular profile were subjected to plastic deformation during machining, their hardness and strength are higher compared to the original material of the cylindrical 15 or flat 10 blank.

The method for producing surfaces with alternating ridges and depressions can be most effectively used to produce convective and condensation-evaporation heat exchange surfaces. The surfaces produced according to the invention possess a higher heat transfer. This is due to broad technological possibilities of the method, ensuring the provision of heat transfer surfaces with the given geometric and thermophysical characteristics, as well as the surfaces with different shapes of projections.

The method can also be used to obtain ribbed surfaces with a small pitch and width of depressions (depressions between ribs). These ribbed surfaces with a slot width from unity to tens of micrometers are required to produce capillary-porous structures of heat tubes, as well as edge filters of fine cleaning.

The method provides extensive possibilities for producing composition layers (coatings) of big thickness, adjustable composition and properties. These coatings are required to enhance wear-resistance or corrosion-resistance of the work piece surfaces. The surfaces with alternating projections and depressions, produced according to the invention, can be used as the base for applying different coatings, e.g., by plasma spraying.

The method of the invention for producing alternating ridges and depressions of a triangular shape makes it possible, compared to threading by means of a cutter, to reduce the quantity of material cut off in the form of chips, in so doing, the full thread profile is formed to the entire depth only for one run of the tool. The method permits the formation of an external and internal thread profile on thin-walled tubes.

The method does not require special equipment, it is wastes-free (exception is the formation of the profile of triangular ridges), does not require lubricant-cooling liquids, and it is accomplished at conventional metal-cutting machines.

The tool for realizing the method of the invention has a simple shape, it is sharpened only in three planes.

Thus, the method is universal for producing alternating ridges and depressions of different designation on the surfaces of work pieces, and is extensively applied in various sectors of the machine-building industry.

INDUSTRIAL APPLICABILITY

The invention can be used in the general, power, chemical, refrigeration and cryogenic machine building.

We claim:

1. A method for producing on a blank a surface having a profile of alternating ridges and depressions with parallel sides, comprising:

as a first step, employing a tool with a rectilinear cutting edge having:

a main angle $\phi$ in a plan of said tool according to a relationship:

$$\phi = \arcsin |a/(S \cdot \epsilon)|$$

where $a$ = a given thickness of a ridge
$S$ = a given pitch of said ridges of said profile
$\epsilon$ = a distortion factor of said ridge profile equal to between 0.9 and 1.1,
an auxiliary angle $\phi_1$ in said plan view of said tool equal to $(90° - \psi)$,
where $\psi$ is a preset angle of deviation of a projection of said ridge from a vertical position with respect to said blank,
a depth of penetration $t$ equal to $$t = [h - \epsilon - S \cdot \cos(\phi - \psi)/2] \cdot (\sin \phi / \cos \psi),$$

where $h$ = a given height of said ridges of said profile, and
a feed $S_o$ equal to said pitch of said ridges, and
as a second step, moving said blank and said tool relative to each other, and undercutting and plastically deforming a surface layer of said blank with said tool while preserving an undercut layer on said surface to form alternating ridges and depressions with parallel sides.

2. The method as claimed in claim 1, further comprising producing depressions essentially with a zero width by providing said main angle $\phi$ in said plan of said tool at least equal to said auxiliary angle $\phi_1$ in said plan of said tool.

3. The method as claimed in claim 1, further comprising additionally machining said surface with a main direction of said tool at an angle to a main direction of said tool during initial machining.

4. The method as claimed in claim 3, further comprising providing in said additional machining at least one parameter selected from the group consisting of said feed $S_o$ of said tool, said depth of penetration $t$ of said tool, said main angle $\phi$ of said tool, and said auxiliary angle $\phi_1$ of said tool different from at least one of said parameters during said initial machining.

5. The method as claimed in claim 1, further comprising changing at least one of said feed $S_o$ of said tool, and said depth of penetration $t$ of said tool during said initial or additional machining.

6. The method as claimed in claim 1, further comprising machining on both sides of a sheet blank with different directions of main movement of said tool so that a total depth of penetration of said tool is greater than an initial thickness $h$ of said sheet blank.

7. The method as claimed in claim 1, further comprising filling said depressions with material of a different composition than material of said blank having properties different from properties of material of said blank when machining alternate ridges and depressions in said surface or thereafter.

8. The method as claimed in claim 1, further comprising changing properties of material at said ridges when producing said surface with alternate ridges and depressions or thereafter.

9. The method as claimed in claim 1, further comprising altering at least one of a cutting surface, a surface being machined, and a surface that has been machined thus changing a configuration of projections obtained during machining.

10. The method as claimed in claim 9, further comprising providing a depth of depressions on said cutting surface at least equal to said thickness of said ridges obtained during basic machining to provide through openings in said ridges.

11. The method as claimed in claim 1, further comprising plastically deforming tops of said ridges during or after machining to produce platforms thereon.

12. The method as claimed in claim 11, further comprising plastically deforming said tops of said ridges until sides of said platforms tightly contact each other.

13. The method as claimed in claim 1, further comprising periodically disruption said ridges lengthwise, separating one end of a ridge from said blank and bending said separated end towards said tool.

14. The method as claimed in claim 1, further comprising forming at least one internal recess on said blank so that a distance from said surface to said recess is less than said depth of penetration $t$ of said tool.

15. The method as claimed in claim 1, further comprising forming recesses on said blank that communicate with depressions on a previously machined surface.

16. The method as claimed in claim 1, further comprising subjecting said blank to at least one of elastic and plastic deformation prior to or after machining said blank.

17. The method as claimed in claim 1, further comprising imparting rotary main motion to at least one tool when producing said alternating ridges and depressions.

18. A method for producing on a blank a surface having alternating ridges and depressions with a triangular profile and parallel sides, comprising:

as a first step, providing a tool having a rectilinear cutting edge, having:

a depth of penetration $t$ equal to at least $$t = S/(ctg\,\omega + ctg\,\omega_1 + \sqrt{2ctg\,\omega \cdot ctg\,(\omega/2 + \omega_1/2)}\;),$$

where $S$ = a given pitch of said ridges of said triangular profile,
$\omega$ and $\omega_1$ = slopes of sides of said triangular profile, and
a feed $S_0$ equal to said pitch of said ridges,
a direction of said feed $S_0$ to a side opposite said cutting edges, and
a main angle $\phi$ and an auxiliary angle $\phi_1$ in a plan of said tool equal to said slopes $\omega$ and $\omega_1$, respectively, and
as a second step, moving said tool and said blank relative to each other, and undercutting and plastically deforming a surface layer of said blank with said tool while preserving an undercut layer on said surface to form alternating ridges and depressions with a triangular profile and parallel sides.

19. The method as claimed in claim 18, further comprising obtaining a triangular, symmetric thread profile with pitch S and angle $\beta$ between said sides of said ridges for an external thread profile or between said sides of said depressions for an internal thread profile, wherein said depth t of penetration of said tool is at least equal to:

$$t=0.29S \cdot ctg(\beta/2)$$

said external thread profile is determined from the relationship:

$$D_0=D-0.71S \cdot ctg(\beta/2),$$

where $D_0$ is an outside diameter of said blank, and D is a given outside diameter across tops of said thread profile, and said internal thread profile is determined from the relationship:

$$D_2=D_1-0.59S \cdot ctg(\beta/2),$$

where $D_2$ is an inside diameter of said blank and $D_1$ is a given diameter of said thread profile across said depressions.

20. A tool for producing surfaces with alternating ridges and depressions comprising a cutter having a front surface, a main rear surface and an auxiliary rear surface, said front surface and said main rear surface intersecting to form a rectilinear main cutting edge, and said front surface and said auxilliary rear surface intersecting to form a rectilinear auxilliary edge, said tool having a front angle $\gamma$ in a range of 10 degrees to 65 degrees and an angle $\gamma_1$ between a main plane A and a line of intersection of said front surface with a C—C plane, perpendicular to a ridge of said auxilliary edge onto said main plane A, in a range of 30 degrees to 80 degrees, wherein an obtuse angle is formed between said front surface and said auxilliary rear surface.

* * * * *